US012694669B1

(12) United States Patent
  Corbin et al.

(10) Patent No.:  US 12,694,669 B1
(45) Date of Patent:  Jul. 28, 2026

(54) SYSTEM AND METHOD FOR PROPERTY DATA MANAGEMENT

(71) Applicant: Cape Analytics, Inc., Palo Alto, CA (US)

(72) Inventors: Matthew Corbin, Palo Alto, CA (US); Giacomo Vianello, Palo Alto, CA (US); Kyler J. Brown, Palo Alto, CA (US); Matthieu Portail, Palo Alto, CA (US); Franziska Zimmermann, Palo Alto, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 634 days.

(21) Appl. No.: 18/104,969

(22) Filed: Feb. 2, 2023

Related U.S. Application Data

(60) Provisional application No. 63/327,736, filed on Apr. 5, 2022, provisional application No. 63/305,851, filed on Feb. 2, 2022, provisional application No. 63/305,856, filed on Feb. 2, 2022.

(51) Int. Cl.
  *G06V 20/10*    (2022.01)
  *G06V 10/762*   (2022.01)
  *G06V 10/82*    (2022.01)

(52) U.S. Cl.
  CPC .......... *G06V 20/176* (2022.01); *G06V 10/762* (2022.01); *G06V 10/82* (2022.01)

(58) Field of Classification Search
  CPC ..... G06V 20/176; G06V 10/762; G06V 10/82
  See application file for complete search history.

(56) References Cited

U.S. PATENT DOCUMENTS

| | | | |
|---|---|---|---|
| 5,633,946 A | 5/1997 | Lachinski et al. | |
| 6,044,171 A | 3/2000 | Polyakov et al. | |
| 6,249,616 B1 | 6/2001 | Hashimoto | |
| 7,327,902 B2 | 2/2008 | Ritt et al. | |
| 7,873,238 B2 | 1/2011 | Schultz et al. | |
| 7,945,117 B2 | 5/2011 | Hermosillo et al. | |
| 8,078,436 B2 | 12/2011 | Pershing et al. | |
| 8,081,841 B2 | 12/2011 | Schultz et al. | |
| 8,145,578 B2 | 3/2012 | Pershing et al. | |
| 8,170,840 B2 | 5/2012 | Pershing | |

(Continued)

FOREIGN PATENT DOCUMENTS

| | | |
|---|---|---|
| CN | 101549596 B | 8/2012 |
| CN | 103679726 A | 3/2014 |

(Continued)

OTHER PUBLICATIONS

Lee, Xiang , et al., "System and Method for Property Analysis", U.S. Appl. No. 18/303,990, filed Apr. 20, 2023.

(Continued)

*Primary Examiner* — Michael J Vanchy, Jr.
(74) *Attorney, Agent, or Firm* — Polsinelli PC

(57) ABSTRACT

A method for property data management can include: determining a set of values for an attribute of a property from a set of sources, and determining a final value for the attribute based on the set of values. However, the method can additionally and/or alternatively include any other suitable elements. The method functions to determine an accurate value for each of a set of attributes for a property.

17 Claims, 15 Drawing Sheets

(56)                References Cited

U.S. PATENT DOCUMENTS

| | | | |
|---|---|---|---|
| 8,207,964 B1 | 6/2012 | Meadow et al. |
| 8,209,152 B2 | 6/2012 | Pershing |
| 8,396,256 B2 | 3/2013 | Lu et al. |
| 8,401,222 B2 | 3/2013 | Thornberry et al. |
| 8,452,125 B2 | 5/2013 | Schultz et al. |
| 8,515,125 B2 | 8/2013 | Thornberry et al. |
| 8,531,472 B2 | 9/2013 | Freund et al. |
| 8,542,880 B2 | 9/2013 | Thornberry et al. |
| 8,548,248 B2 | 10/2013 | Mitchell et al. |
| 8,655,070 B1 | 2/2014 | Yang et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,760,285 B2 | 6/2014 | Billman et al. |
| 8,774,525 B2 | 7/2014 | Pershing |
| 8,818,770 B2 | 8/2014 | Pershing |
| 8,823,732 B2 | 9/2014 | Adams et al. |
| 8,825,454 B2 | 9/2014 | Pershing |
| 8,848,983 B1 | 9/2014 | Brewington et al. |
| 8,965,812 B2 | 2/2015 | Linville |
| 8,977,520 B2 | 3/2015 | Stephens et al. |
| 8,995,757 B1 | 3/2015 | Ciarcia et al. |
| 9,117,310 B2 | 8/2015 | Coene et al. |
| 9,129,376 B2 | 9/2015 | Pershing |
| 9,135,737 B2 | 9/2015 | Pershing |
| 9,141,880 B2 | 9/2015 | Ciarcia |
| 9,147,287 B2 | 9/2015 | Ciarcia |
| 9,159,130 B2 | 10/2015 | Kneepkens |
| 9,159,164 B2 | 10/2015 | Ciarcia |
| 9,183,538 B2 | 11/2015 | Thornberry et al. |
| 9,244,589 B2 | 1/2016 | Thornberry et al. |
| 9,275,496 B2 | 3/2016 | Freund et al. |
| 9,292,913 B2 | 3/2016 | Schultz et al. |
| 9,329,749 B2 | 5/2016 | Thornberry et al. |
| 9,389,084 B1 | 7/2016 | Chen et al. |
| 9,437,029 B2 | 9/2016 | Schultz et al. |
| 9,514,568 B2 | 12/2016 | Pershing et al. |
| 9,520,000 B2 | 12/2016 | Freund et al. |
| 9,536,148 B2 | 1/2017 | Gross |
| 9,542,738 B2 | 1/2017 | Schultz et al. |
| 9,576,201 B2 | 2/2017 | Wu et al. |
| 9,599,466 B2 | 3/2017 | Pershing |
| 9,743,046 B2 | 8/2017 | Giuffrida et al. |
| 9,753,950 B2 | 9/2017 | Schultz et al. |
| 9,805,489 B2 | 10/2017 | Schultz et al. |
| 9,836,882 B2 | 12/2017 | Freund et al. |
| 9,911,228 B2 | 3/2018 | Pershing et al. |
| 9,933,254 B2 | 4/2018 | Thornberry et al. |
| 9,933,257 B2 | 4/2018 | Pershing |
| 9,959,581 B2 | 5/2018 | Pershing |
| 9,959,653 B2 | 5/2018 | Schultz et al. |
| 9,972,126 B2 | 5/2018 | Freund et al. |
| 10,002,415 B2 | 6/2018 | Shen et al. |
| 10,121,207 B1 | 11/2018 | Devereaux et al. |
| 10,169,680 B1 | 1/2019 | Sachdeva et al. |
| 10,197,391 B2 | 2/2019 | Thornberry et al. |
| 10,229,532 B2 | 3/2019 | Freund et al. |
| 10,311,302 B2 | 6/2019 | Kottenstette et al. |
| 10,338,222 B2 | 7/2019 | Schultz et al. |
| 10,346,935 B2 | 7/2019 | Thornberry et al. |
| 10,402,676 B2 * | 9/2019 | Wang ........................ G06T 7/73 |
| 10,430,902 B1 | 10/2019 | Rawat et al. |
| 10,453,147 B1 | 10/2019 | Davis |
| 10,455,197 B2 | 10/2019 | Giuffrida et al. |
| 10,489,953 B2 | 11/2019 | Schultz et al. |
| 10,503,843 B2 | 12/2019 | Keane |
| 10,515,414 B2 | 12/2019 | Pershing |
| 10,528,960 B2 | 1/2020 | Pershing et al. |
| 10,529,029 B2 | 1/2020 | Okazaki |
| 10,571,575 B2 | 2/2020 | Schultz et al. |
| 10,573,069 B2 | 2/2020 | Freund et al. |
| 10,648,800 B2 | 5/2020 | Thornberry et al. |
| 10,650,285 B1 | 5/2020 | Okazaki |
| 10,663,294 B2 | 5/2020 | Pershing et al. |
| 10,685,149 B2 | 6/2020 | Pershing |
| 10,796,189 B2 | 10/2020 | Wang et al. |
| 10,827,190 B1 | 11/2020 | Blasch et al. |
| 10,839,469 B2 | 11/2020 | Pershing |
| 10,937,178 B1 | 3/2021 | Srinivasan |
| 10,943,464 B1 | 3/2021 | Hayward et al. |
| 11,037,255 B1 | 6/2021 | Ganev et al. |
| 11,367,265 B2 | 6/2022 | Vianello et al. |
| 11,392,897 B1 | 7/2022 | Gingrich et al. |
| 11,430,069 B1 | 8/2022 | Pedersen et al. |
| 11,430,076 B1 | 8/2022 | Martin et al. |
| 11,488,255 B1 | 11/2022 | Mast et al. |
| 11,599,706 B1 | 3/2023 | Mark et al. |
| 11,676,298 B1 | 6/2023 | Portail et al. |
| 2003/0146913 A1 | 8/2003 | Shen et al. |
| 2004/0153330 A1 | 8/2004 | Miller et al. |
| 2005/0084178 A1 | 4/2005 | Lure et al. |
| 2005/0154657 A1 | 7/2005 | Kim et al. |
| 2006/0165267 A1 | 7/2006 | Wyman et al. |
| 2008/0133319 A1 | 6/2008 | Adiga et al. |
| 2008/0255862 A1 | 10/2008 | Bailey et al. |
| 2009/0132436 A1 | 5/2009 | Pershing et al. |
| 2009/0304227 A1 | 12/2009 | Kennedy et al. |
| 2010/0014781 A1 | 1/2010 | Liu et al. |
| 2010/0110074 A1 | 5/2010 | Pershing |
| 2010/0111428 A1 | 5/2010 | Yu et al. |
| 2010/0296693 A1 | 11/2010 | Thornberry et al. |
| 2011/0251974 A1 | 10/2011 | Woodard et al. |
| 2012/0005109 A1 | 1/2012 | Stinson |
| 2012/0035887 A1 | 2/2012 | Augenbraun et al. |
| 2012/0120069 A1 | 5/2012 | Kodaira et al. |
| 2012/0141014 A1 | 6/2012 | Lepikhin et al. |
| 2012/0265675 A1 | 10/2012 | Lawrence |
| 2013/0006676 A1 | 1/2013 | Helitzer et al. |
| 2013/0121571 A1 | 5/2013 | Gokturk et al. |
| 2013/0262029 A1 * | 10/2013 | Pershing ............... G06Q 40/00 |
| | | 702/156 |
| 2014/0015924 A1 | 1/2014 | Pryor |
| 2014/0019166 A1 | 1/2014 | Swanson et al. |
| 2014/0067332 A1 | 3/2014 | Chen et al. |
| 2014/0139515 A1 | 5/2014 | Kim et al. |
| 2014/0180989 A1 | 6/2014 | Krizhevsky et al. |
| 2014/0270492 A1 | 9/2014 | Christopulos et al. |
| 2014/0278570 A1 | 9/2014 | Plummer et al. |
| 2015/0029176 A1 | 1/2015 | Baxter et al. |
| 2015/0131852 A1 | 5/2015 | Sweetser et al. |
| 2015/0186953 A1 | 7/2015 | Gross |
| 2015/0187015 A1 | 7/2015 | Adams et al. |
| 2015/0228031 A1 | 8/2015 | Emison et al. |
| 2015/0242747 A1 * | 8/2015 | Packes ................... G06N 3/045 |
| | | 706/17 |
| 2015/0269598 A1 | 9/2015 | Terrazas et al. |
| 2015/0286786 A1 | 10/2015 | El-Baz et al. |
| 2015/0302529 A1 | 10/2015 | Jagannathan |
| 2015/0347872 A1 | 12/2015 | Taylor et al. |
| 2016/0026900 A1 | 1/2016 | Ando |
| 2016/0027051 A1 | 1/2016 | Gross |
| 2016/0048934 A1 | 2/2016 | Gross |
| 2016/0092959 A1 | 3/2016 | Gross |
| 2016/0162779 A1 | 6/2016 | Marcus et al. |
| 2016/0162986 A1 | 6/2016 | Ghosh |
| 2016/0238388 A1 | 8/2016 | Macdonald et al. |
| 2016/0292800 A1 | 10/2016 | Smith |
| 2017/0352099 A1 | 12/2017 | Howe et al. |
| 2017/0357984 A1 | 12/2017 | Takamatsu et al. |
| 2018/0082388 A1 | 3/2018 | Takamatsu et al. |
| 2018/0096420 A1 | 4/2018 | Sun et al. |
| 2018/0101917 A1 | 4/2018 | Fujita |
| 2019/0057465 A1 | 2/2019 | Spath |
| 2019/0065907 A1 | 2/2019 | Strong et al. |
| 2019/0138665 A1 | 5/2019 | Pershing |
| 2019/0188516 A1 | 6/2019 | Porter et al. |
| 2019/0213412 A1 | 7/2019 | Kottenstette et al. |
| 2019/0213438 A1 | 7/2019 | Jones et al. |
| 2019/0304026 A1 | 10/2019 | Lyman et al. |
| 2019/0311044 A1 | 10/2019 | Xu et al. |
| 2019/0354772 A1 | 11/2019 | Tasli et al. |
| 2020/0034861 A1 | 1/2020 | Lundgren et al. |
| 2020/0134733 A1 | 4/2020 | Maddox et al. |
| 2020/0134753 A1 | 4/2020 | Vickers |

(56) References Cited

U.S. PATENT DOCUMENTS

| | | | |
|---|---|---|---|
| 2020/0160030 A1 | 5/2020 | Lavi | |
| 2020/0279653 A1 | 9/2020 | Hayward | |
| 2020/0348132 A1 | 11/2020 | Du et al. | |
| 2021/0042846 A1 | 2/2021 | Plummer et al. | |
| 2021/0089811 A1 | 3/2021 | Strong | |
| 2021/0110439 A1 | 4/2021 | Jayne et al. | |
| 2021/0118165 A1 | 4/2021 | Strong | |
| 2021/0124850 A1 | 4/2021 | Messervy et al. | |
| 2021/0133891 A1 | 5/2021 | Jagannathan | |
| 2021/0151195 A1 | 5/2021 | Hayward | |
| 2021/0188312 A1 | 6/2021 | Shikari et al. | |
| 2021/0224582 A1 | 7/2021 | Afshar et al. | |
| 2021/0279852 A1 | 9/2021 | Jakka et al. | |
| 2022/0012918 A1 | 1/2022 | Kozikowski et al. | |
| 2022/0036486 A1* | 2/2022 | Dhandapani | G06N 20/00 |
| 2022/0036537 A1 | 2/2022 | Johnson et al. | |
| 2022/0099855 A1 | 3/2022 | Li et al. | |
| 2022/0253946 A1 | 8/2022 | Kenney | |
| 2022/0277358 A1 | 9/2022 | Shirai | |
| 2022/0284609 A1 | 9/2022 | Shree et al. | |
| 2022/0366186 A1* | 11/2022 | Sriram | G06N 3/0464 |
| 2022/0405856 A1 | 12/2022 | Hedges et al. | |
| 2023/0011777 A1 | 1/2023 | Brown et al. | |
| 2023/0023808 A1 | 1/2023 | Wall et al. | |
| 2023/0067026 A1 | 3/2023 | Huts et al. | |
| 2023/0119132 A1 | 4/2023 | Cebulski et al. | |
| 2023/0143198 A1 | 5/2023 | Vianello | |
| 2023/0153931 A1 | 5/2023 | Lee | |
| 2023/0237775 A1 | 7/2023 | Portail | |
| 2023/0385882 A1 | 11/2023 | Lee et al. | |

FOREIGN PATENT DOCUMENTS

| | | | |
|---|---|---|---|
| CN | 105917335 A | 8/2016 | |
| CN | 108197583 A | 6/2018 | |
| CN | 108629287 A | 10/2018 | |
| EP | 3151164 A2 | 4/2017 | |
| EP | 3340106 A1 | 6/2018 | |
| EP | 4033426 A1 | 7/2022 | |
| WO | 2012115594 A1 | 8/2012 | |
| WO | 2017040691 A1 | 3/2017 | |

OTHER PUBLICATIONS

Bessinger, et al., "Quantifying curb appeal", 2016 IEEE international conference on image processing (ICIP) . IEEE, 2016. (Year: 2016).

Van Leer, Kevin , "Responding to the Alarm Bell: Enabling a Better Understanding of Defensible Space and Wildfire Risk for Individual Structures", CAPE Analytics, Apr. 11, 2019, https://capeanalytics. com/resources/responding-to-the-alarm-bell-enabling-a-better-understanding-of-defensible-space-and-wildfire-risk-for-individual-structures/.

Hedges, Ryan , et al., "System and Method for Environmental Evaluation", U.S. Appl. No. 18/509,640, filed Nov. 15, 2023.

"Cape Analytics Now Detects Yard Debris From Geospatial Imagery", Dec. 18, 2019, https://capeanalytics.com/cape-analytics-now-detects-yard-debris-from-geospatial-imagery/.

"CLIP: Connecting Text and Images", https://openai.com/blog/clip/, Jan. 5, 2021.

"Gdal_viewshed", © 1998-2022 Frank Warmerdam, Even Rouault, and others, downloaded Aug. 3, 2021, https://gdal.org/programs/gdal_viewshed.html.

"Hail Risk Assessment Hail Risk Score, Hail Damage Score", Verrisk Analytics, downloaded Oct. 15, 2021, https://www.verisk.com/insurance/products/hail-risk-assessment/.

"Industry-Leading Wildfire Risk Insights", zesty.ai, downloaded Oct. 15, 2021, https://www.zesty.ai/wildfire-risk.

"Manage wildfire risk at the address level", Verisk, downloaded Oct. 15, 2021, https://www.verisk.com/siteassets/media/downloads/underwriting/location/location-fireline.pdf?1=.

"The Real Value of Change Detection: A ChangeFinderTM Story Map", https://www.eagleview.com/newsroom/2018/02/real-value-change-detection/, EagleView US, Feb. 28, 2018.

"Unique Building Identifier (UBID)", Office of Energy Efficiency & Renewable Energy, https://www.energy.gov/eere/buildings/unique-building-identifier-ubid#:~:text=UBID, first downloaded Dec. 22, 2022.

Ali, Imtiaz , "Unsupervised video analysis for counting of wood in river during floods", Springer-Verlag, 2009, pp. 578-587 (year: 2009).

Arrowsmith, Ellie , et al., "Wildfire Fuel Management and Risk Mitigation", Insurance Institute for Business & Home Safety, zesty. ai, Apr. 2021.

Baranzini, Andrea , et al., "A Sight for Sore Eyes Assessing the value of view and landscape use on the housing market", Publisher:CRAG—Haute école de gestion de Genève, Genève, 2007.

Carlberg, Matthew , et al., "Classifying Urban Landscape in Aerial LIDAR Using 3D Shape Analysis", IEEE, 978-1-4244-5654-3, 2009, pp. 1701-1704 (Year: 2009).

Chen, Yixing , et al., "development of city—modeling", Energy and Buildings, 2019, pp. 252-265 (Year 2019).

Dai, Xieer , et al., "Viewshed Effects and House Prices: Estimating A Spatial Hedonic Model", https://alrov.tau.ac.il/wp-content/uploads/2021/08/%D7%93%D7%A0%D7%99%D7%90%D7%9C-%D7%A4%D7%9C%D7%96%D7%A0%D7%A9%D7%98%D7%99%D7%99%D7%9F-2019.pdf, downloaded Aug. 3, 2021.

Eigen, David , et al., "Depth Map Prediction from a Single Image using a Multi-Scale Deep Network", Proceedings of Advances in Neural Information Processing Systems (NIPS), Jun. 2014.

Friedland, Carol , et al., "Integrated Aerial-Based and ground Based-Scales", ResearchGate, Feb. 9, 2015, pp. 1-7 (Year: 2015).

Jiang, Shasha , et al., "Automatic urban debris zone extraction from post-hurricane very high-resolution satellite and aerial imagery", Geomatics, Natural Hazards and Risk, 7:3, 933-952, https://www.tandfonline.com/doi/full/10.1080/19475705.2014.1003417, 2016.

Kalinicheva, Ekaterina , et al., "Unsupervised Change Detection Analysis in Satellite Image Time Series using Deep Learning Combined with Graph-Based Approaches", https://hal.archives-ouvertes.fr/hal-02749683, Jun. 3, 2020.

Kamara, Amadu Fullah , et al., "A hybrid neural network for predicting Days on Market a measure of liquidity in real estate industry", ScienceDirect, Knowledge-Based Systems, 208 (2020) 106417.

Kotova, Nadia , et al., "Liquidity in Residential Real Estate Markets", Apr. 2021, https://anthonyleezhang.github.io/pdfs/sfipd.pdf.

Lee, Jun-Tae , et al., "Image Aesthetic Assessment Based on Pairwise Comparison—A Unified Approach to Score Regression, Binary Classification, and Personalization", 2019 IEEE/CVF International Conference on Computer Vision (ICCV), Oct. 27, 2019-Nov. 2, 2019.

Maire, Frederic , et al., "A Convolutional Neural Network for Automatic Analysis of Aerial Imagery", 2014 International Conference on Digital Image Computing: Techniques and Applications (DICTA), 8 pages (2014).

Mansouri, Babak , "Earthquake building damage detection using VHR Satellite data", Case study; Two villages near Sarpol-e Zahab) , JSEE, Jul. 29, 2018, pp. 45-55 (Year: 2018).

Moussa, A. , et al., "Man-made objects classification from satellite/aerial imagery using neural networks", International Archives of the Photogrammetry, Remote Sensing and Spatial Information Sciences—ISPRS Archives, 4 pages (2010).

Muhs, Sebastian , "Automatic delineation—maps", Elsevier, 2016, p. 71-84 (Year: 2016).

Plank, Simon , "Rapid damage—Sentinel", Remote Sensing, May 28, 2014, pp. 4870-4906 (Year 2014).

Poursaeed, Omid , et al., "Vision-based Real Estate Price Estimation", arXiv:1707.05489 [cs.CV], https://doi.org/10.48550/arXiv.1707.05489, Machine Vision and Applications, 29(4), 667-676, 2018.

Radford, Alec , et al., "Learning Transferable Visual Models From Natural Language Supervision", arXiv:2103.00020v1 [cs.CV] Feb. 26, 2021.

(56) References Cited

OTHER PUBLICATIONS

Tran, Kieu , "Applying Segmentation and Neural Networks to Detect and Quantify Marine Debris From Aerial w Images Captured by an Unmanned Aerial System and Mobile Device", Aug. 2018, pp. 1-70 (Year 2018).

Urbis, Arvydas , et al., "GIS-Based Aesthetic Appraisal of Short-Range Viewsheds of Coastal Dune and Forest Landscapes", Forests 2021, 12, 1534. https://doi.org/10.3390/f12111534.

Wang, Jianjun , et al., "Generating Viewsheds without Using Sightlines", Photogrammetric Engineering & Remote Sensing, vol. 66 No. 1, Jan. 2000, pp. 87-90.

Wang, Xuenting , et al., "Predicting the Attractiveness of Real-Estate Images by Pairwise Comparison using Deep Learning", 2019 IEEE International Conference on Multimedia & Expo Workshops (ICMEW), Shanghai, China, 2019, pp. 84-89, doi: 10.1109/ICMEW.2019.0-106.

Yu, Bailang , et al., "Automated derivation—method", Landscape and urban planning, 2020, pp. 210-219 (Year: 2010).

Zhu, Hengshu , et al., "Days on Market: Measuring Liquidity in Real Estate Markets", KDD '16, Aug. 13-17, 2016, San Francisco, CA, USA.

Miao, Haotian , et al., "Multimodal Aesthetic Analysis Assisted by Styles through a Multimodal co-Transformer Model", 2021 IEEE 24th International Conference on Computational Science and Engineering (CSE), Shenyang, China, 2021, pp. 43-50, doi: 10.1109/CSE53436.2021.00016.

Ucan, Nazli Ozge, "Aesthetic Quality Assessment for Real Estate Images Through Deep Learning Methods", Thesis, Middle East Technical University, Dec. 2022.

"English translation of CN-105917335".

A, Mark , et al., "An Accuracy Assessment of Various GIS-Based Viewshed Delineation Techniques", 2016.

Tucker, Catherine , "Days on market and home sales", Days on market and home sales. The RAND Journal of Economics, 44(2), 337-360. (Year: 2013).

Ermolin, S. V., et al., "Predicting Days-on-Market for Residential Real Estate Sales".

Hamaguchi, Ryuhei , et al., "Rare Event Detection using Disentangled Representation Learning", arXiv:1812.01285, submitted Dec. 4, 2018, 2019 IEEE/CVF Conference on Computer Vision and Pattern Recognition (CVPR) Long Beach, CA, USA, Jun. 15-20, 2019.

Johnson , et al., "Valuing curb appeal", The Journal of Real Estate Finance and Economics 60 (2020): 111-133. (Year: 2020).

Liu , et al., "Learning multi-instance deep ranking and regression network for visual house appraisal", IEEE Transactions on Knowledge and Data Engineering 30.8 (2018): 1496-1506. (Year: 2018).

Neptune, Nathalie , et al., "Automatic Annotation of Change Detection Images", Sensors, published Feb. 5, 2021.

Corbin, Matthew , et al., "System and Method for Property Data Management", U.S. Appl. No. 18/104,969, filed Feb. 2, 2023.

* cited by examiner

SYSTEM AND METHOD FOR PROPERTY DATA MANAGEMENT

CROSS-REFERENCE TO RELATED APPLICATIONS

This application claims the benefit of U.S. Provisional Application No. 63/327,736, filed 5 Apr. 2022, U.S. Provisional Application No. 63/305,856, filed 2 Feb. 2022, and U.S. Provisional Application No. 63/305,851, filed 2 Feb. 2022, each of which is incorporated in its entirety by this reference.

TECHNICAL FIELD

This invention relates generally to the data management field, and more specifically to a new and useful method and system for data refinement in the data management field.

DETAILED DESCRIPTION

The following description of embodiments of the invention is not intended to limit the invention to these embodiments, but rather to enable any person skilled in the art to make and use this invention.

1. Overview

Figure 1:
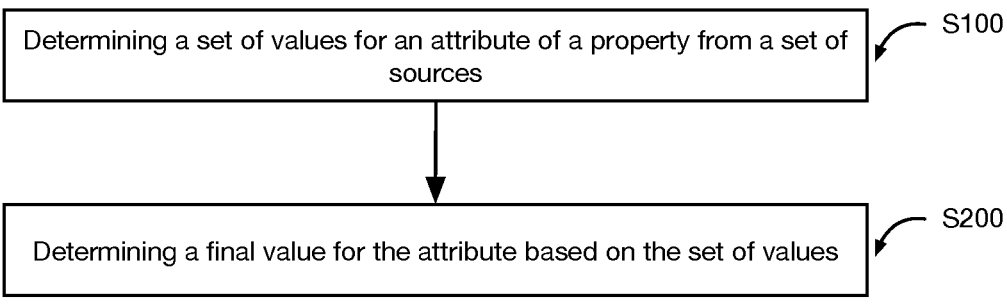
FIG. 1 is a flowchart representation of the method.

As shown in FIG. 1, the method for property data management can include: determining a set of values for an attribute of a property from a set of sources S100, and determining a final value for the attribute based on the set of values S200. However, the method can additionally and/or alternatively include any other suitable elements.

The method functions to determine an accurate value for each of a set of attributes for a property. For example, this can be accomplished by fusing multiple data sources, generating a new attribute value de novo (e.g., with a higher accuracy or a higher confidence value), and/or otherwise accomplished.

Figure 2:
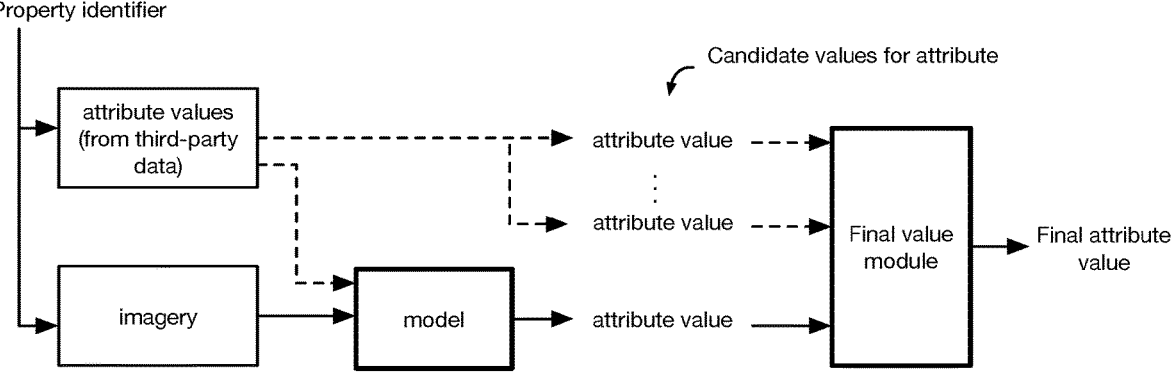
FIG. 2 is an illustrative example of determining a final attribute value.
Figure 9:
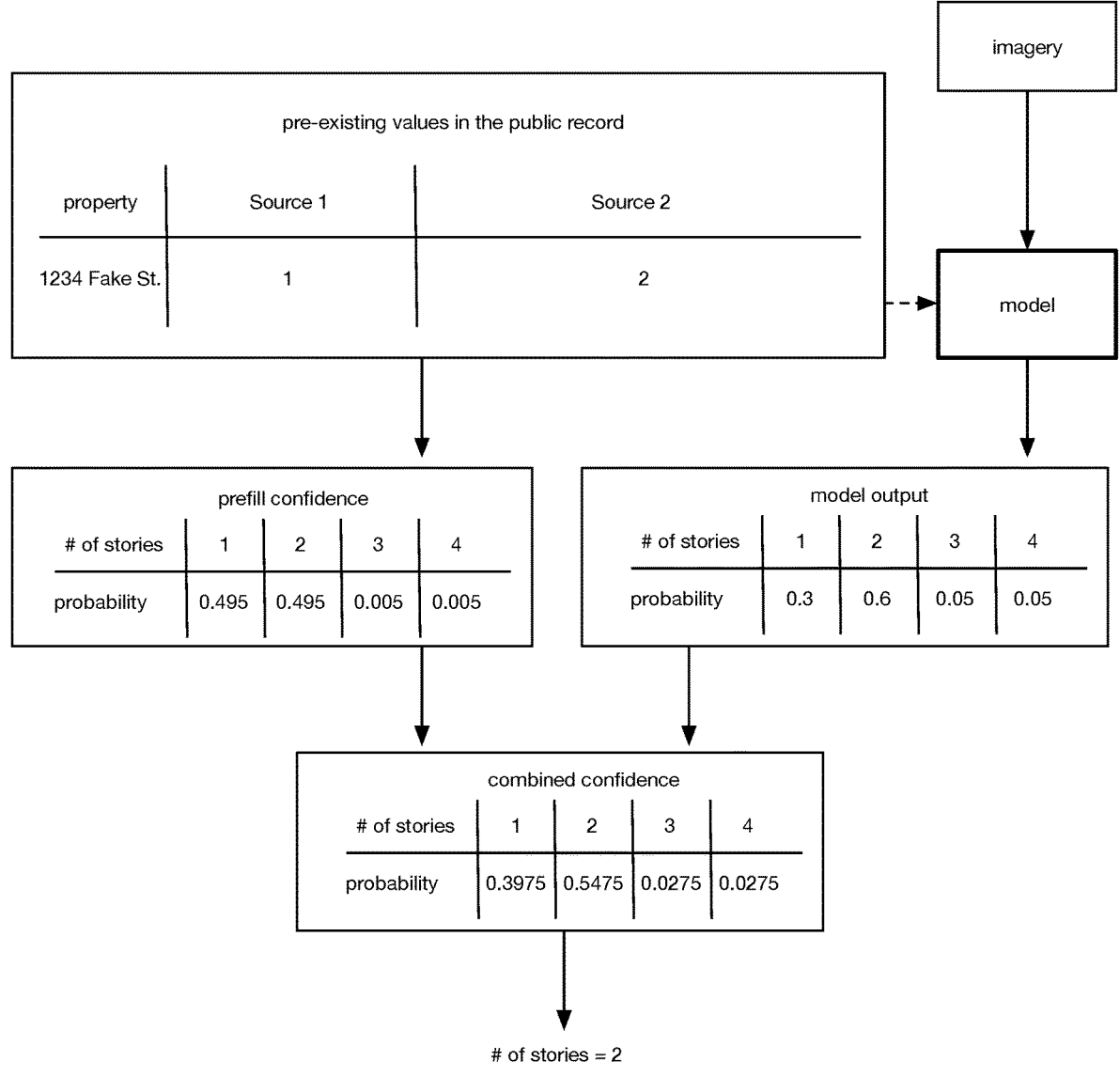
FIG. 9 is an illustrative example of combining confidence metrics of the model and third-party data.
Figure 10:
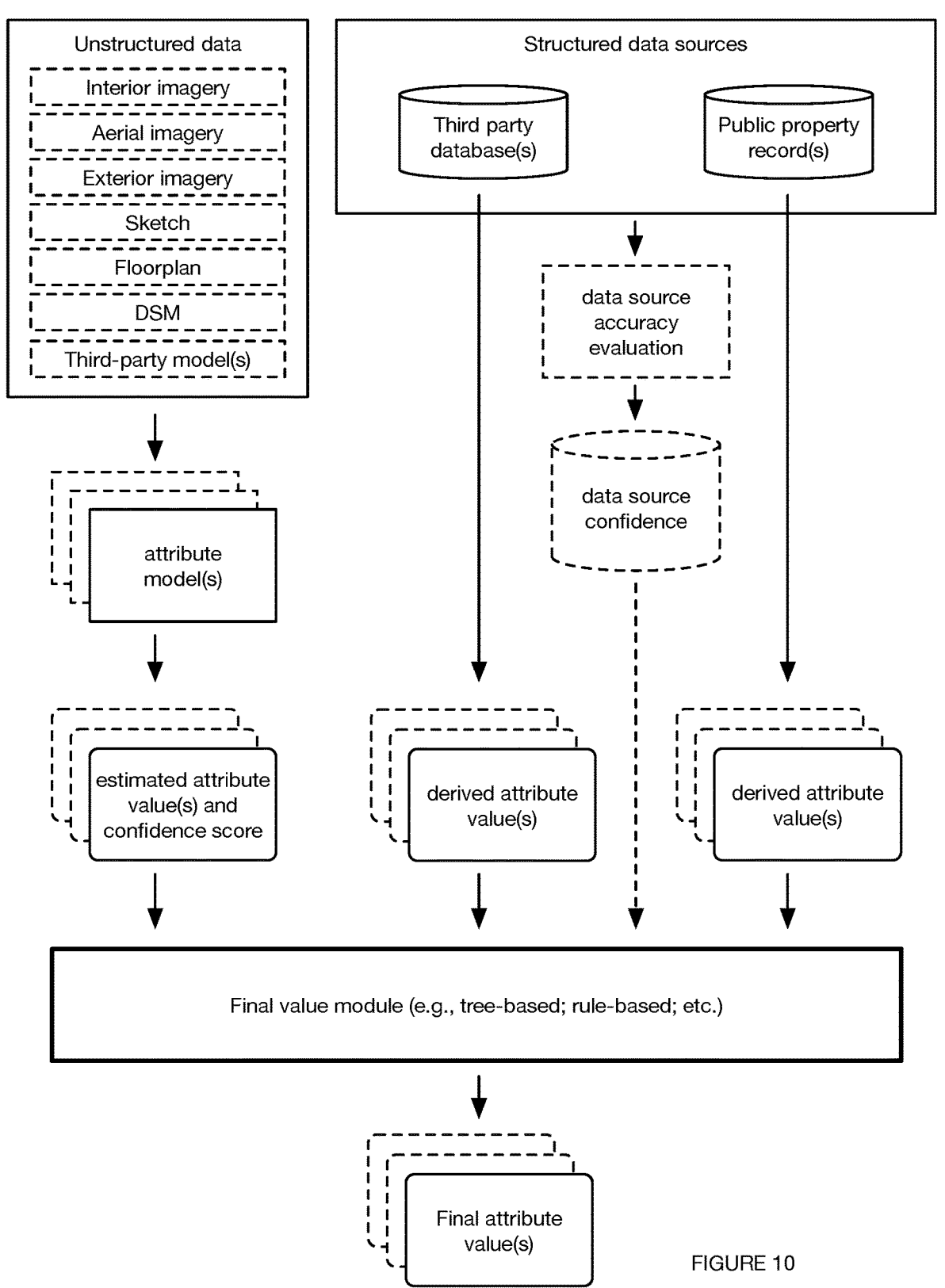
FIG. 10 is an illustrative example of determining a final attribute value.

In an illustrative example (e.g., shown in FIG. 2), the method includes: determining raw property data (e.g., imagery, depth information, sketch data, etc.) for a given property; determining values for each of a set of property attributes based on the raw property data; retrieving third party values for each property attribute from a set of third party sources; and determining a final value for each property attribute based on the third party values and the determined values (e.g., the candidate values). In a specific example, the final value for each property attribute can be determined by calculating a combined confidence metric for each potential value for a given attribute and selecting the value with the highest confidence metric. The combined confidence metric can be determined from the confidence metric for the determined values and/or third-party values (e.g., example shown in FIG. 9), or otherwise determined. The confidence metric for the determined value can be output by the attribute model (e.g., be the probability for the determined value, such as when the model is a multiclass classifier, a regression model, a Bayesian model, or other probabilistic model) or otherwise determined. The confidence metrics for the third-party values can be determined based on the identity of the third-party data source (e.g., the tax assessor is correct 95% of the time), determined based on the agreement between multiple third party data sources (e.g., example shown in FIG. 9), inferred using other property attributes (e.g., the number of stories and the footprint of a property can have an influence on the confidence metric for living area value), and/or otherwise determined. In a second example, a set of quantiles can be determined for each of a set of candidate values by the attribute model (e.g., based on the raw property data), wherein the final attribute value can be selected from the third-party values based on the respective quantile. The final value can be used to automatically fill in property forms (e.g., insurance forms, real estate forms, appraisal forms, etc.), verify the third-party data, identify discrepancies for further verification, estimate property value or cost (e.g., replacement cost), or be otherwise used.

In a first set of variants, the method can include: determining raw property data for a property, the raw property data including imagery of the property; based on the raw property data, estimating an attribute value and a confidence metric for each of a set of property attributes using a pretrained neural network; retrieving a set of third-party values for each property attribute of the set; automatically determining a final value for each property attribute based on the set of third-party values, the estimated value, and the confidence metric; automatically prefilling the final value for each property attribute of the set into a property form; and providing the property form, prefilled with the final value for each property attribute of the set, to a remote endpoint.

In a second set of variants, nonexclusive with the first set, a method for property replacement cost estimation can include: receiving a set of raw property data for a property; with a set of pretrained machine learning (ML) models, determining an ML-model estimate based on the raw property data, the ML-model estimate including an attribute value and a confidence metric for each of a plurality of property attributes; retrieving a set of tax assessment values, each corresponding to a respective property attribute of the plurality; with a tree-based model, automatically determining a replacement cost for the property based on the set of tax assessment values, the ML model estimate, the confidence metric; and providing the replacement cost to a remote endpoint.

2. Technical Advantages

Variants of the technology can confer several benefits over conventional systems and benefits.

Conventionally, structured data from public records are relied upon for property attribute values (e.g., living area, number of bedrooms, number of bathrooms, number of stories, quality grade, etc.). However, these attribute values are difficult to obtain, measured in different ways (e.g., as the definition of property attributes vary on a county-by-county level), difficult to normalize, have low coverage (e.g., values exist for some geographic regions but do not exist for other geographic regions; various counties may have different approaches for assessing attributes or may not assess certain attributes; etc.), have sparse (or entirely lack) true priors or sources of truth, and may be generally noisy or inaccurate.

Variants of the technology can increase coverage (e.g., determine property attribute values for properties missing values), determine the confidence ratings, and/or determine the accuracy of these values by using values extracted from new sources of data, using new data extraction methods and/or exploiting correlations among different features within the same third-party dataset or across different third-party datasets. For example, property attribute values can be extracted from geospatial imagery (e.g., such as aerial photos, satellite images, thermal images, digital elevation models (DEMs), scanned maps, land classification maps and surfaces, etc.) and/or sketch data, using one or more models trained to predict said attribute values. In variants, this data can be fused with third-party attribute values (e.g., structured data values, tabular data values, etc.) to generate a confidence level, select a third-party attribute value, and/or generate a more accurate value for the attribute.

However, the technology can confer any other suitable benefits.

3. System

Figure 15:
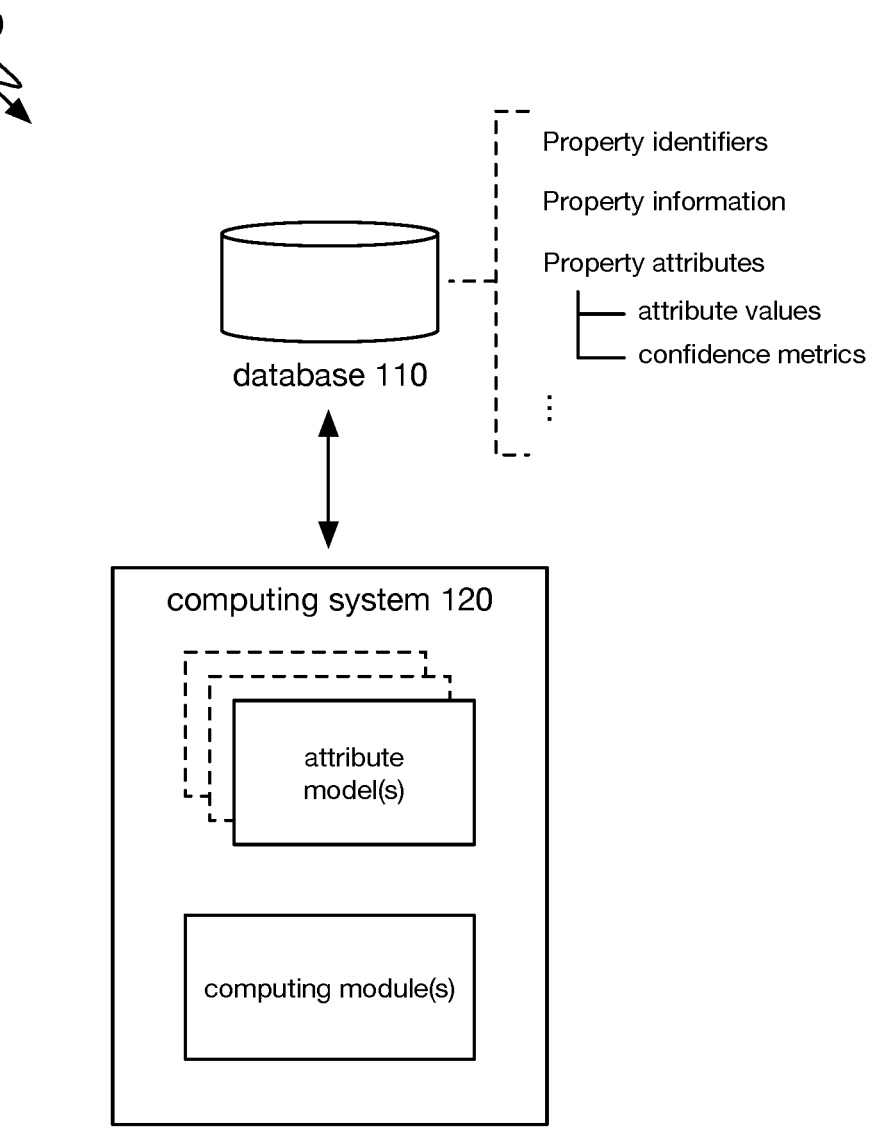
FIG. 15 is a schematic diagram of a variant of the system.

The system 100, an example of which is shown in FIG. 15, can include a database 110, a computing system 120, and/or any other suitable components. The system can function to facilitate execution of the method.
3.1 Properties.

The system and/or method can be used in conjunction with one or more properties. The properties can function as test properties (e.g., properties of interest), training properties (e.g., used to train the model(s)), and/or be otherwise used.

Each property can be or include: a land (e.g., a parcel, geographic region, etc.), a property component or set or segment thereof, and/or otherwise defined. For example, the property can include both the underlying land and improvements (e.g., built structures, fixtures, etc.) affixed to the land, only include the underlying land, or only include a subset of the improvements (e.g., only the primary building). Property components can include: built structures (e.g., primary structure, accessory structure, deck, pool, etc.); subcomponents of the built structures (e.g., roof, siding, framing, flooring, living space, bedrooms, bathrooms, garages, foundation, HVAC systems, solar panels, slides, diving board, etc.); permanent improvements (e.g., pavement, statutes, fences, etc.); temporary improvements or objects (e.g., trampoline); vegetation (e.g., tree, flammable vegetation, lawn, etc.); land subregions (e.g., driveway, sidewalk, lawn, backyard, front yard, wildland, etc.); debris; and/or any other suitable component/elements. The property and/or components thereof are preferably physical, but can alternatively be virtual.

Each property can be identified by one or more property identifiers. A property identifier (property ID) can include: geographic coordinates, an address, a parcel identifier, a location identifier (e.g., Google Plus Codes™, Geohashes™, Place Key™, etc.), a block/lot identifier, a planning application identifier, a municipal identifier (e.g., determined based on the ZIP, ZIP+4, city, state, etc.), and/or any other identifier. The property identifier can be used to retrieve property information, such as parcel information (e.g., parcel boundary, parcel location, parcel area, etc.), property measurements, property descriptions, and/or other property data. The property identifier can additionally or alternatively be used to identify a property component, such as a primary building or secondary building, and/or be otherwise used.

In variants, the property can be a parcel (e.g., land), a built structure (e.g., a house, condominium, warehouse, deck, etc.), a segment of a built structure (e.g., a room, a garage, etc.), fixtures, a physical structure (e.g., a pool, a statue), vegetation (e.g., a tree, a garden), a combination thereof, and/or any other suitable object. For example, the property can include both the underlying land and improvements (e.g., built structures, fixtures, etc.) affixed to the land. The property can be identified by a property identifier (e.g., an address, a lot number, latitude/longitude coordinates, an automatically-assigned identifier, etc.) and/or otherwise identified.

3.2 Property Information.

Each property can be associated with property information. The property information can be extracted from another piece of property information, be structured or tabular data retrieved from a third-party, be received from a user, and/or be otherwise obtained. The property information can be static (e.g., remain constant over a threshold period of time) or variable (e.g., vary over time). The property information can be associated with: a time (e.g., a generation time, a valid duration, etc.), a source (e.g., the information source), an accuracy or error, and/or any other suitable metadata. The property information is preferably specific to the property, but can additionally or alternatively be from other properties (e.g., neighboring properties, other properties sharing one or more attributes with the property). Examples of property information can include: measurements, descriptions, attributes, auxiliary data, and/or any other suitable information about the property.

Property measurements preferably measure an aspect about the property, such as a visual appearance, geometry, and/or other aspect. In variants, the property measurements can depict a property (e.g., the property of interest), but can additionally or alternatively depict the surrounding geographic region, adjacent properties, and/or other factors. The measurement can be: 2D, 3D, and/or have any other set of dimensions. Examples of measurements can include: images, surface models (e.g., digital surface models (DSM), digital elevation models (DEM), digital terrain models (DTM), etc.), point clouds (e.g., generated from LIDAR, RADAR, stereoscopic imagery, etc.), depth maps, depth images, virtual models (e.g., geometric models, mesh models), audio, video, radar measurements, ultrasound measurements, and/or any other suitable measurement. Examples of images that can be used include: RGB images, hyperspectral images, multispectral images, black and white images, grayscale images, panchromatic images, IR images, NIR images, UV images, thermal images, and/or images sampled using any other set of wavelengths; images with depth values associated with one or more pixels (e.g., DSM, DEM, etc.); and/or other images.

The measurements can include: remote measurements (e.g., geospatial imagery, aerial imagery, satellite imagery, balloon imagery, drone imagery, etc.), local or on-site measurements (e.g., sampled by a user, streetside measurements, etc.), and/or sampled at any other proximity to the property. The remote measurements can be measurements sampled more than a threshold distance away from the property, such as more than 100 ft, 500 ft, 1,000 ft, any range therein, and/or sampled any other distance away from the property. The measurements can be: top-down measurements (e.g., nadir measurements, panoptic measurements, etc.), side measurements (e.g., elevation views, street measurements, etc.), angled and/or oblique measurements (e.g., at an angle to vertical, orthographic measurements, isometric views, etc.), and/or sampled from any other pose or angle relative to the property. The measurements can depict the property exterior, the property interior, and/or any other view of the property.

The measurements can be a full-frame measurement, a segment of the measurement (e.g., the segment depicting the property, such as that depicting the property's parcel; the segment depicting a geographic region a predetermined distance away from the property; etc.), a merged measurement (e.g., a mosaic of multiple measurements), orthorectified, and/or otherwise processed.

The measurements can be received as part of a user request, retrieved from a database, determined using other data (e.g., segmented from an image, generated from a set of images, etc.), synthetically determined, and/or otherwise determined.

Property information can include structured property information (e.g., standardized format; stored in association with a particular property attribute). For example, a year built value can be organized/stored in association with the respective attribute. Additionally, property information and/or measurements thereof can be unstructured and/or can include raw/unstructured data, such as building imagery, sketches, virtual models, point clouds, and/or any other suitable information which is not organized and stored in association with a particular property attribute and/or without directly specifying an attribute value(s) (i.e., unstructured property information may be used by an attribute model to determine an attribute value).

The property information can include property descriptions. The property description can be: a written description (e.g., a text description), an audio description, and/or in any other suitable format. The property description is preferably verbal but can alternatively be nonverbal. Examples of property descriptions can include: listing descriptions (e.g., from a realtor, listing agent, etc.), property disclosures, inspection reports, permit data, appraisal reports, and/or any other text based description of a property.

The property information can include auxiliary data. Examples of auxiliary data can include property descriptions, permit data, insurance loss data, inspection data, appraisal data, broker price opinion data, property valuations, property attribute and/or component data (e.g., values), and/or any other suitable data.

However, the property information can include any other suitable information about the property.

3.3 Property Attributes

Each property can be associated with a set of property attributes, which function to represent one or more aspects of a given property. The property attributes can be semantic, quantitative, qualitative, and/or otherwise describe the property. Each property can be associated with its own set of property attributes, and/or share property attributes with other properties. As used herein, property attributes can refer to the attribute parameter (e.g., the variable) and/or the attribute value (e.g., value bound to the variable for the property).

Property attributes can include: property components, features (e.g., feature vector, mesh, mask, point cloud, pixels, voxels, any other parameter extracted from a measurement), any parameter associated with a property component (e.g., property component characteristics), semantic features (e.g., whether a semantic concept appears within the property information), and/or higher-level summary data extracted from property components and/or features. Property attributes can be determined based on property information for the property itself, neighboring properties, and/or any other set of properties. Property attributes can be automatically determined, manually determined, and/or otherwise determined.

Property attributes can be intrinsic, extrinsic, and/or otherwise related to the property. Intrinsic attributes are preferably inherent to the property's physical aspects, and would have the same values for the property independent of the property's context (e.g., property location, market conditions, etc.), but can be otherwise defined. Examples of intrinsic attributes include: record attributes, structural attributes, condition attributes, and/or other attributes determined from measurements or descriptions about the property itself. Extrinsic attributes can be determined based on other properties or factors (e.g., outside of the property). Examples of extrinsic attributes include: attributes associated with property location, attributes associated with neighboring properties (e.g., proximity to a given property component of a neighboring property), and/or other extrinsic attributes. Examples of attributes associated with the property location can include distance and/or orientation relative to a: highway, coastline, lake, railway track, river, wildland and/or any large fuel load, hazard potential (e.g., for wildfire, wind, fire, hail, flooding, etc.), other desirable site (e.g., park, beach, landmark, etc.), other undesirable site (e.g., cemetery, landfill, wind farm, etc.), zoning information (e.g., residential, commercial, and industrial zones; subzoning; etc.), and/or any other attribute associated with the property location.

Property attributes can include: structural attributes, condition attributes, record attributes, semantic attributes, subjective attributes, and/or any other suitable set of attributes.

Structural attributes can include: structure class/type, parcel area, framing parameters (e.g., material), flooring (e.g., floor type; area of each floor type, such as carpet area), historical construction information (e.g., year built, year updated/improved/expanded, etc.), area of living space, the presence or absence of a built structure (e.g., deck, pool, ADU, garage, etc.), physical or geometric attributes of the built structure (e.g., structure footprint, roof surface area, number of roof facets, roof slope, pool surface area, building height, number of beds, number of baths, number of stories, etc.), relationships between built structures (e.g., distance between built structures, built structure density, setback distance, count, etc.), presence or absence of an improvement (e.g., solar panel, etc.), ratios or comparisons therebetween, and/or any other structural descriptors.

Condition-related attributes can include: roof condition (e.g., tarp presence, material degradation, rust, missing or peeling material, sealing, natural and/or unnatural discoloration, defects, loose organic matter, ponding, patching, streaking, etc.), wall condition, exterior condition, accessory structure condition, yard debris and/or lot debris (e.g., presence, coverage, ratio of coverage, etc.), lawn condition, pool condition, driveway condition, tree parameters (e.g., overhang information, height, etc.), vegetation parameters (e.g., coverage, density, setback, location within one or more zones relative to the property), presence of vent coverings (e.g., ember-proof vent coverings), structure condition, occlusion (e.g., pool occlusion, roof occlusion, etc.), pavement condition (e.g., percent of paved area that is deteriorated), resource usage (e.g., energy usage, gas usage, etc.), overall property condition, and/or other parameters (e.g., that are variable and/or controllable by a resident). Condition-related attributes can be a rating for a single structure, a minimum rating across multiple structures, a weighted rating across multiple structures, and/or any other individual or aggregate value.

Record attributes can include: number of beds/baths, construction year, square footage, legal class (e.g., residential, mixed-use, commercial, etc.), legal subclass (e.g., single-family vs. multi-family, apartment vs. condominium, etc.), location (e.g., neighborhood, zip code, etc.), location factors (e.g., positive location factors such as distance to a park, distance to school; negative location factors such as distance to sewage treatment plans, distance to industrial zones; etc.), population class (e.g., suburban, urban, rural, etc.), school district, orientation (e.g., side of street, cardinal direction, etc.) and/or any other suitable attributes (e.g., that can be extracted from a property record or listing).

Semantic attributes (e.g., semantic features) can include whether a semantic concept is associated with the property (e.g., whether the semantic concept appears within the property information). Examples of semantic attributes can include: whether a property is in good condition (e.g., "turn key", "move-in ready", or related terms appear in the description), "poor condition", "walkable", "popular", small (e.g., "cozy" appears in the description), and/or any other suitable semantic concept. The semantic attributes can be extracted from: the property descriptions, the property measurements, and/or any other suitable property information. The semantic attributes can be extracted using a model (e.g., an NLP model, a CNN, a DNN, etc.) trained to identify keywords, trained to classify or detect whether a semantic concept appears within the property information, and/or otherwise trained.

Subjective attributes can include: curb appeal, viewshed, and/or any other suitable attributes. Other property attributes can include: built structure values (e.g., roof slope, roof rating, roof material, root footprint, covering material, etc.), auxiliary structures (e.g., a pool, a statue, ADU, etc.), risk asset scores (e.g., asset score indicating risk of flooding, hail, wildfire, wind, house fire, etc.), neighboring property values (e.g., distance of neighbor, structure density, structure count, etc.), and/or any other suitable attributes.

Example property attributes can include: structural attributes (e.g., for a primary structure, accessory structure, neighboring structure, etc.), record attributes (e.g., number of bed/bath, construction year, square footage, living space square footage, roof area, number of floors, legal class, legal subclass, geographic location, etc.), condition attributes (e.g., yard condition, roof condition, pool condition, paved surface condition, etc.), semantic attributes (e.g., semantic descriptors), location (e.g., parcel centroid, structure centroid, roof centroid, etc.), property type (e.g., single family, lease, vacant land, multifamily, duplex, etc.), property component parameters (e.g., area, enclosure, presence, structure type, count, material, construction type, area condition, spacing, relative and/or global location, distance to another component or other reference point, density, geometric parameters, condition, complexity, etc.; for pools, porches, decks, patios, fencing, etc.), storage (e.g., presence of a garage, carport, etc.), permanent or semi-permanent improvements (e.g., solar panel presence, count, type, arrangement, and/or other solar panel parameters; HVAC presence, count, footprint, type, location, and/or other parameters; etc.), temporary improvement parameters (e.g., presence, area, location, etc. of trampolines, playsets, etc.), pavement parameters (e.g., paved area, percent illuminated, paved surface condition, etc.), foundation elevation, terrain parameters (e.g., parcel slope, surrounding terrain information, etc.), legal class (e.g., residential, mixed-use, commercial), legal subclass (e.g., single-family vs. multi-family, apartment vs. condominium), geographic location (e.g., neighborhood, zip, etc.), population class (e.g., suburban, urban, rural, etc.), school district, orientation (e.g., side of street, cardinal direction, etc.), subjective attributes (e.g., curb appeal, viewshed, etc.), built structure values (e.g., roof slope, roof rating, roof material, roof footprint, covering material, number of roof facets, etc.), auxiliary structures (e.g., a pool, a statue, ADU, etc.), risk scores (e.g., score indicating risk of flooding, hail, fire, wind, wildfire, etc.), neighboring property values (e.g., distance to neighbor, structure density, structure count, median year built, etc.), context (e.g., hazard context, geographic context, vegetation context, weather context, terrain context, etc.), historical construction information, historical transaction information (e.g., list price, sale price, spread, transaction frequency, transaction trends, etc.), semantic information, and/or any other attribute that remains substantially static after built structure construction.

In one set of variants, the attributes can include: a quality grade rating, quality grade reason code(s) (e.g., crown molding presence, countertop material, cabinet material, cabinet door style, doors, vaulted ceiling presence, built-in bookcase presence, wet bar presence, chandelier presence, etc.), brick presence (e.g., with number/percentage of brick stories), garage presence, garage type, garage size, year-built, roof geometry, roof covering, bedroom count, full bathroom count, half bathroom count, foundation material, foundation type, basement type, basement finish, basement area, basement daylight, finished basement area, unfinished basement area, fireplace presence, fireplace count, dwelling units, structure style, floor covering, heating type, cooling type, exterior construction, exterior finish, interior construction, interior finish, chimney presence, brick presence, number of stories, detached structure presence, detached structure type, detached structure size, detached structure living area above, bay windows, parcel slope, building height, roof slope, building volume, structure shape, site access, porches, walk-out basement presence, structure style, dormer count, attic window, skylights, interior object presence/classification(s), and/or any other suitable attributes.

In variants, the set of attributes that are used (e.g., by the models) can be selected from a superset of candidate attributes. This can function to: reduce computational time and/or load (e.g., by reducing the number of attributes that need to be extracted and/or processed), increase score prediction accuracy (e.g., by reducing or eliminating confounding attributes), and/or be otherwise used. The set of attributes can be selected: manually, automatically, randomly, recursively, using an attribute selection model, using lift analysis (e.g., based on an attribute's lift), using any explainability and/or interpretability method, based on an attribute's correlation with a given metric or training label, using predictor variable analysis, through predicted outcome validation, during model training (e.g., attributes with weights above a threshold value are selected), using a deep learning model, based on a zone classification, and/or via any other selection method or combination of methods. As an example, the set of attributes that are used may be specific to the data entry fields of a property form/service—such as a replacement cost estimation form/service.

Attribute values can be discrete, continuous, binary, multiclass, and/or otherwise structured. The attribute values can be associated with time data (e.g., from the underlying measurement timestamp, value determination timestamp, etc.), a hazard event, an uncertainty parameter, and/or any other suitable metadata.

Attribute values can optionally be associated with an uncertainty parameter. Uncertainty parameters can include variance values, a confidence score, a probability, a quantile (e.g., which quantile each candidate attribute value falls within), and/or any other uncertainty metric. In a first illustrative example, the attribute value model classifies the roof material for a structure as: shingle with 90% confidence, tile with 7% confidence, metal with 2% confidence, and other with 1% confidence. In a second illustrative example, 10% of the roof is obscured (e.g., by a tree), which can result in a 90% confidence interval for the roof geometry attribute value. In a third illustrative example, the vegetation coverage attribute value is 70%±10%. In a fourth illustrative example, attributes can be characterized with a quantile distribution of attribute values (e.g., wherein the uncertainty parameter for each attribute value is determined based on the quantile that the value falls within or a probability of the quantile distribution).

The attributes can be determined from property information (e.g., property measurements, property descriptions, etc.), a database or a third party source (e.g., third-party database, MLS™ database, city permitting database, historical weather and/or hazard database, tax assessor database, etc.), be predetermined, be calculated (e.g., from an extracted value and a scaling factor, etc.), and/or be otherwise determined. In a first example, the attributes can be determined by extracting features from property measurements, wherein the attribute values can be determined based on the extracted feature values. In a second example, a trained attribute model can predict the attribute value directly from property information (e.g., based on property imagery, descriptions, unstructured data/measurement of the property, etc.). In a third example, the attributes can be determined by extracting features from a property description (e.g., using a sentiment extractor, keyword extractor, etc.). However, the attributes can be otherwise determined. In examples, property attributes and/or values thereof can defined and/or determined as disclosed in U.S. application Ser. No. 17/475,523 filed Sep. 15, 2021, U.S. application Ser. No. 17/526,769 filed Nov. 15, 2021, U.S. application Ser. No. 17/546,620 filed Dec. 9, 2021, U.S. application Ser. No. 17/529,836 filed Nov. 18, 2021, U.S. application Ser. No. 17/749,385 filed May 20, 2022, U.S. application Ser. No. 17/870,279 filed Jul. 21, 2022, U.S. application Ser. No. 17/858,422 filed Jul. 6, 2022, U.S. application Ser. No. 17/968,662 filed Oct. 18, 2022, U.S. application Ser. No. 17/841,981 filed Jun. 16, 2022, U.S. application Ser. No. 18/074,295 filed Dec. 2, 2022, and/or U.S. application Ser. No. 18/098,829 filed 19 Jan. 2023, each of which is incorporated in its entirety by this reference (e.g., wherein features and/or feature values disclosed in the references can correspond to attributes and/or attribute values).

Property attributes and attribute values can be determined contemporaneously with method execution, asynchronously from method execution, in real time or near real time (NRT) with respect to method execution, and/or with any other suitable frequency/timing. Attributes and values can be stored by the processing system performing the determination of property attributes, and/or by any other suitable system. Preferably, storage can be temporary, based on time (e.g., 1 day, 1 month, etc.), based on use (e.g., after one use of the property attribute values by the asset prediction model), based on time and use (e.g., after one week without use of property attribute values), and/or based on any other considerations. Alternatively, property asset data is permanently stored.

However, any other suitable property attribute and/or value thereof can be determined.

3.4 Models

The system can be used with one or more models. The model(s) can be or include: neural networks (e.g., CNN, DNN, etc.), an equation (e.g., weighted equations), regression (e.g., leverage regression), classification (e.g., binary classifiers, multiclass classifiers, semantic segmentation models, instance-based segmentation models, etc.), segmentation algorithms (e.g., neural networks, such as CNN based algorithms, thresholding algorithms, clustering algorithms, etc.), rules, heuristics (e.g., inferring the number of stories of a property based on the height of a property), instance-based methods (e.g., nearest neighbor), regularization methods (e.g., ridge regression), decision trees, Bayesian methods (e.g., Naïve Bayes, Markov, etc.), kernel methods, statistical methods (e.g., probability), deterministic methods, support vectors, genetic programs, isolation forests, robust random cut forest, clustering, selection and/or retrieval (e.g., from a database and/or library), comparison models (e.g., vector comparison, image comparison, etc.), object detectors (e.g., CNN based algorithms, such as Region-CNN, fast RCNN, faster R-CNN, YOLO, SSD-Single Shot MultiBox Detector, R-FCN, etc.; feed forward networks, transformer networks, generative algorithms (e.g., diffusion models, GANs, etc.), and/or other neural network algorithms), key point extraction, SIFT, any computer vision and/or machine learning method (e.g., CV/ML extraction methods), and/or any other suitable model or methodology.

The model(s) can be (pre-) trained using: self-supervised learning, semi-supervised learning, supervised learning, unsupervised learning, reinforcement learning, transfer learning, Bayesian optimization, positive-unlabeled learning, using backpropagation methods, and/or otherwise learned. The model can be learned or trained on: labeled data (e.g., data labeled with the target label), unlabeled data, positive training sets (e.g., a set of data with true positive labels, negative training sets (e.g., a set of data with true negative labels), and/or any other suitable set of data.

The system 100 and/or method can include or be used with: attribute models, final value models, and/or other models.

The system 100 and/or method can include or be used with one or more attribute models, which function to determine attribute values for one or more property attributes. Each attribute model can determine values for a single attribute (e.g., be a binary classifier, be a multiclass classifier, etc.), multiple attributes (e.g., be a multiclass classifier), and/or for any other suitable set of attributes. A single attribute value can be determined using a single attribute model, multiple attribute models, and/or any other suitable number of attribute models.

Inputs to the attribute model, used to determine attribute values for a given property, can include property information (e.g., a property dataset) for the given property, property information for associated properties (e.g., neighboring properties), and/or any other suitable set of inputs. The property information can include: measurements, descriptions, auxiliary data, parcel data, an attribute value distribution or confidence score (e.g., determined by an upstream attribute model), values for other attributes, and/or any other suitable information for the property. The property information can be associated with: a single property, a larger geographic context (e.g., based on a region larger than the property parcel size), and/or otherwise associated with one or more properties. The inputs can optionally be associated with a common timestamp, with a common timeframe (e.g., all determined within the same week, month, quarter, season, year, etc.), with different timeframes, and/or otherwise temporally related.

The outputs of the attribute model can be: values for one or more property attributes, image feature segments, property measurements, property identifiers, uncertainty parameters (e.g., a confidence score for each attribute value prediction), and/or any other suitable information.

The final value model (final value module) functions to determine the final or true attribute value. The system 100 can include one or more final value models. Each final value model can determine the final values for one or more attributes, the confidence score for the final value, and/or other outputs. The final value model can determine the final attribute value based on the values for the attribute determined from the third-party sources, the attribute value and/or distribution thereof determined by one or more attribute models, property information (e.g., measurements, images, etc. of the property), values for other attributes, and/or any other suitable input. In examples, the final value model can be: a voting model (e.g., the final attribute value has the most votes, the majority of votes, a quorum of votes, etc.), a neural network (e.g., trained to predict the correct final attribute value using a sparse prior as the training target, etc.), a ruleset (e.g., select the attribute value closest to the $50^{th}$ quantile, select the attribute value closest to a sum of the attribute values weighted by the respective quantiles, select the attribute value with a confidence interval within a predetermined range, etc.), regression (e.g., wherein the attribute value is weighted based on a confidence score for the respective third-party data source, wherein the third-party data source confidence score can be calculated based on sparse prior data for a subset of properties, etc.), decision tree, and/or any other model. Different attributes can have different final value models and/or model types.

However, the system can include or use any other suitable models.

The system can optionally include or be used with a database 110 which can function to store property identifiers, property information (e.g., measurements, auxiliary data, etc.), attribute values, typicality metrics, reference population information (e.g., property sets), and/or any other information. The database can be local, remote, distributed, or otherwise arranged relative to any other system or module. In variants, the database can be or interface with a third-party source (e.g., third-party database, MLS database, city permitting database, historical weather and/or hazard database, tax assessor database, etc.), but can alternatively not interface with a third-party source. For example, information in the database can be retrieved, linked, or otherwise associated with information in a third-party source. In an example, a property identifier for each of a set of properties is stored in the database, wherein attribute values are stored in association with the corresponding property identifier for all or a subset of the properties. Attribute values can optionally be edited and/or appended to the database when new property information (e.g., recent imagery or other measurements) is added. The database can be queried (e.g., based on a property identifier) to retrieve measurements, attribute values, typicality metrics, and/or any other information in the database.

The system can optionally include a computing system 120. The computing system can function to execute all or portions of the method, and/or perform any other suitable functionality. The computing system can be local (e.g., a user device such as a smartphone, laptop, desktop, tablet, etc.), remote (e.g., one or more servers, one or more platforms, etc.), distributed, or otherwise arranged relative to any other system or module. The computing system can include one or more: CPUs, GPUs, custom FPGA/ASICS, microprocessors, servers, cloud computing, and/or any other suitable components. The computing system can be used with a user interface (e.g., mobile application, web application, desktop application, API, database, etc.) or not be used with a user interface. The user interface can be used to: receive and/or input property identifiers and/or property requests, present attribute values, present typicality metrics, and/or otherwise used. The computing system can optionally interface with the databases 110.

In variants, the computing system 120 can include or be used with a set of computing modules, which functions to facilitate execution of method elements. For example, the computing system can include a first computing module which functions to determine an attribute value in accordance with S100 and a second computing module (e.g., a value module) which functions to determine a final value for an attribute associated with a property in accordance with block S200. However, the computing system can alternatively include a single computing module which functions to facilitate execution of an instance of the method, multiple computing modules (e.g., centralized, distributed between various computing endpoints; executing synchronous and/or contemporaneous processing; executing asynchronous processing operations; etc.), and/or can be otherwise implemented.

However, the system can include any other suitable elements.

4. Method

The method can include: determining a set of values for an attribute of a property from a set of sources S100, and determining a final value for the attribute based on the set of values S200. However, the method can be otherwise performed. The method functions to determine an accurate value for each of a set of attributes for a property.

One or more instances of the method can be repeated for different properties, different attributes, different sources, different timeframes, different models, and/or otherwise repeated.

The method is preferably performed by a remote system (e.g., platform; a remote instance of the system 100), but can additionally and/or alternatively be performed by any other suitable system. All or portions of the method can be performed: once, periodically, repeatedly, in response to a request from an endpoint, before receipt of a request, and/or any other suitable timing/frequency. As a first example, the method can be executed in response to a user request (e.g., via an API) associated with a property form for a particular property. As a second example, various portions of method processing can be precomputed for a particular property (e.g., attribute values can be precomputed and/or stored within a database) prior to a user request for information and/or property form completion regarding the property.

The method can be performed for a property identified in the request (e.g., from an insurance entity), for a manually identified property, for a randomly determined property, for all properties within a geographic region (e.g., a manually-determined geographic region, all properties depicted in an image, etc.), and/or for any other suitable property. For example, the property can include both the underlying land and improvements (e.g., built structures, fixtures, etc.) affixed to the land.

The method can be used to determine attribute values for a set of attributes (e.g., as described above), which can include one or more of: a quality grade rating, quality grade reason code(s) (e.g., crown molding presence, countertop material, cabinet material, cabinet door style, doors, vaulted ceiling presence, built-in bookcase presence, wet bar presence, chandelier presence, etc.), brick presence (e.g., with number/percentage of brick stories), garage presence, garage type, garage size, year-built, roof geometry, roof covering, bedroom count, full bathroom count, half bathroom count, foundation material, foundation type, basement type, basement finish, basement area, basement daylight, finished basement area, unfinished basement area, fireplace presence, fireplace count, dwelling units, structure style, floor covering, heating type, cooling type, exterior construction, exterior finish, interior construction, interior finish, chimney presence, brick presence, number of stories, detached structure presence, detached structure type, detached structure size, detached structure living area above, bay windows, parcel slope, building height, roof slope, building volume, structure shape, site access, porches, walk-out basement presence, structure style, dormer count, attic window, skylights, interior object presence/classification(s), and/or any other suitable attributes.

In variants, the set of property attributes can be predetermined (e.g., for each instance of the method, for a particular property form), automatically determined (e.g., based on the fields of a property form), manually determined (e.g., for a particular user request, etc.), and/or otherwise determined/specified. In variants, an instance of the method can be executed to determine an accurate (final) value of a single attribute (e.g., square footage/living area; etc.). Alternatively, the method can be used to simultaneously and/or contemporaneously determine accurate (final) values of multiple attributes for a particular property (e.g., corresponding to the fields of a property form, for instance). However, the method can be otherwise executed with any other suitable timing and/or for any other suitable set of attributes.

Determining a set of values for each attribute of a property from a set of sources S100 functions to determine one or more candidate values for each attribute of a given property. For example, S100 can determine multiple values for a property's number of stories.

The values for each attribute from the same source can be determined together (e.g., using the same model, using the same request, etc.) or determined separately (e.g., using different models, using different requests, etc.).

Each value in a given set (e.g., for an attribute) is preferably determined from a different source and/or determined using a different method. Alternatively, values in the set can be determined from the same source and/or method. Values of the set are preferably aggregated from one or more sources, but can alternatively be aggregated from a single source. Sources can include: third-party sources, models (e.g., trained to predict the attribute value), and/or any other suitable source. Examples of third-party sources include: public tax assessor data, real estate data, property-level hazard data, building permits, databases, aggregators such as ATTOM™, and/or any other suitable data.

In a first variant, S100 can include retrieving attribute values from each of a set of sources (e.g., structured data sources, third-party data sources, etc.). In an illustrative example, S100 includes querying each source for a property's number of stories, living area, quality grade, number of beds, and number of baths.

Figure 3:
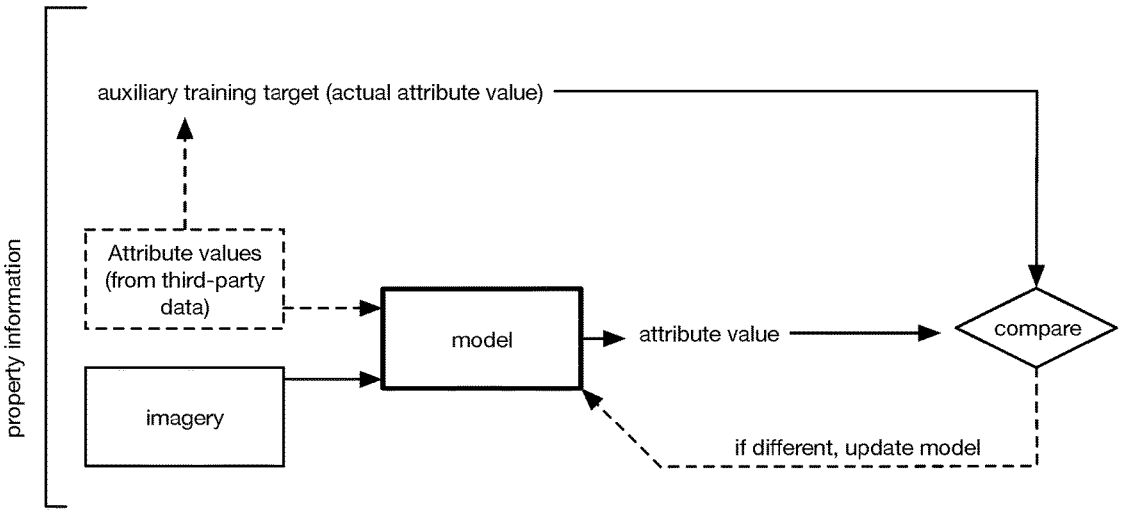
FIG. 3 is an illustrative example of training a model.

In a second variant, S100 can include predicting the attribute value using a trained model (example shown in FIG. 3; an attribute model; etc.)

The attribute value can be predicted based on: sketch data (e.g., building sketch, structure dimensions, story height on sketch, living area, room area, room type, room organization, etc.), imagery (e.g., remote imagery, interior imagery, exterior imagery, etc.), third-party data (e.g., values for the attribute, values for other attributes, etc.), any/or any other property information/data. In variants, the third-party data (e.g., third-party source) can exclude the third party sources used for attribute model and/or final value model training or tuning. For example, MLS™ and/or tax assessor data can be excluded from the third-party data sources used to determine the final attribute value.

The sketch data can be retrieved from a database, extracted from a virtual model of the property, manually determined (e.g., drawn by one or more humans), and/or any otherwise determined. The virtual model can be generated by a user (e.g., colocalized with the property), generated using photogrammetric techniques (e.g., based on a series of images with known relationships, known kinematic parameters associated with image recordation, etc.), and/or otherwise generated. The virtual model can be of the property interior, exterior, and/or any other suitable portion of the property.

The imagery is preferably remote imagery (e.g., geospatial imagery, aerial imagery, drone imagery, satellite imagery, etc.), but can alternatively be interior imagery, and/or any other suitable imagery. Each image can depict: a top-down view of the property, an oblique view of the property, an elevation view of the property, and/or any other suitable perspective. The image can be: a 2-dimensional image, a 3-dimensional image, a DSM, and/or any other suitable image. The imagery can be associated with measurement parameters, or not be associated with measurement parameters. Measurement parameters can include: scene class (e.g., such as interior scene, exterior scene, etc.), perspective (e.g., front elevation view, top-planar view), provider, modality, season, time of day, and/or any other suitable parameter.

The model can be specific to one or more properties, property types (e.g., single family home, multi-family home, commercial, residential, etc.), geographic regions (e.g., specific to a particular county or tax assessment region), specific one or more attributes, specific one or more measurement parameters, generic to any of the above, and/or otherwise specific or generic.

The training target for the model can be: binary, non-binary, numerical, categorical, and/or any other suitable characteristic. The training target is preferably determined from sketch data (e.g., Hover™, iLOOKABOUT/APEX™, etc.), but can alternatively be determined using floorplan data (e.g., Cubicasa™), blueprints, manually determined (e.g., manually-specified values), third-party data (e.g., ATTOM™, MLS, Estated™, etc.), by a different model and/or algorithm, a combination thereof, and/or otherwise determined. The sketch data can be in the format of: a PDF, vector drawings, tabular data, CAD, and/or any other suitable format. In one example, the model can be trained to predict attribute values extracted from sketch data based on property imagery. In this example, the sketch data, particularly those generated from virtual models or using photogrammetric techniques (e.g., only possible recently, due to new developments in computer vision and modeling), can be treated as an accurate source of ground-truth data, particularly when the sketch data is generated based on in-situ measurements (e.g., images, distance measurements, optical flow measurements, etc.) of the property.

In a specific example, a preliminary model can be trained to determine (e.g., select) a true attribute value (e.g., true living area value) from a set of third-party values for the attribute (e.g., attribute values from MLS™ and tax assessor data), wherein accurate sparse data (e.g., floorplan or sketch data, Cubicasa™ data, etc.) can be used as the preliminary model's training target. The set of third-party values are preferably for properties where the attribute's values are similar but do not exactly match (e.g., to avoid situations where one data source copied the value from the other data source), but can alternatively be for properties where the third party attribute values deviate more than a threshold amount, less than a threshold amount, match, and/or otherwise differ. The trained preliminary model can then be used to determine the training target from the third-party data sources (e.g., select the "true" attribute value) for other properties, wherein the training target can be used to train the attribute model (e.g., the attribute model is trained to predict the selected attribute value based on raw property data). The third party data sources used to train the preliminary model and/or attribute model are preferably not used when determining the final attribute value, but can alternatively be used.

In another specific example, an attribute model can be trained to predict the physical dimensions of an object (e.g., the living area). In this example, the attribute model can be trained to predict the attribute value based on an image segment of the property (e.g., resized to a fixed input image size), a physical size corresponding to a raw pixel (e.g., the physical footprint depicted by a pixel of the original image), a resize factor that was used to resize the image segment to the input image size, and/or other inputs. In operation, an example of the model can be trained to predict the living area from a resized image in units of the number of pixels in its input space, then apply this geolocation-dependent pixel scaling factor to rescale the model's prediction to physical size (m² or sqft).

However, the training targets can be otherwise determined.

The model can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, massaging the dataset, apply different weights to instances of the dataset), adversarial debiasing, Reject Option based Classification (ROC), Discrimination-Aware Ensemble (DAE), temporal modeling, continuous measurement, converging to an optimal fair allocation, feedback loops, strategic manipulation, regulating conditional probability distribution of disadvantaged sensitive feature values, decreasing the probability of the favored sensitive feature values, training a different model for every sensitive attribute value, and/or any other suitable method and/or approach.

In variants, the model for each property attribute is pretrained using supervised learning with an independent training dataset (e.g., separate from raw property data/ measurement, tax assessment values, third-party data sources, etc.).

The model is preferably a multi-class classifier (e.g., that predicts the probability that the asset value is one of a predetermined set of values), but can alternatively be a binary classifier, a neural network (e.g., CNN, DNN, etc.), compositional methods, ensemble methods (e.g., boosting ensemble method, bagging ensemble method, stacking ensemble method, etc.), leverage regression, rules, heuristics, equations (e.g., weighted equations), instance-based methods (e.g., nearest neighbor), regularization methods (e.g., ridge regression), tree-based models/methods (e.g., Boosted decision tree), kernel methods, voting methods, Kalman filtering methods, regression models, probabilistic models (e.g., Bayesian methods such as Naïve Bayes, Markov), deterministic models, support vectors, and/or any other suitable model or methodology.

The model can be specific to a single attribute, or predict values for multiple attributes. For example, the system can include a different model for each attribute, include a single model for all attributes (e.g., wherein the model predicts a probability for each possible value for each attribute), and/or include any other suitable number of models. The system can include one or more models for each attribute. Different model types can be used for different attributes. For example, living area and construction year can be determined using a regression, while other attributes (e.g., beds, baths, number of stories, quality grade, etc.) can be determined using one or more multiclass classifiers.

In use, the model preferably outputs one or more attribute values, but can additionally and/or alternatively output a distribution of attribute values for an attribute (e.g., quantile distribution), a probability for each attribute value, a confidence interval associated with the attribute value, a confidence level associated with the attribute value, and/or generate any other suitable output.

In a first example, the model is trained to predict a number of stories based on oblique imagery. In a specific example, the model is a multi-class classifier that predicts the probability for each class, wherein the set of classes includes: 1 story, 2 stories, 3 stories, 4 stories, and 5 stories. The set of classes can also include mixed story classes (e.g., for split-level homes): 1 and 2 stories, 2 and 3 stories, 3 and 4 stories, 4 and 5 stories.

In a second example, the model is trained to predict whether an attic is finished, wherein a finished attic can be treated as a half-story. The model is trained based on oblique imagery and/or depth information (e.g., DSM data), wherein the model can identify indicators (e.g., a dormer on a roof, an attic window, etc.) to determine the potential presence and/or absence of a built structure (e.g., a finished floor area). In a first specific example, the model is trained to predict whether a half-story exists. In a second specific example, the model is trained to predict whether a half-story indicator is present, wherein a half story is added to the number of stories when the half-story indicator is detected.

However, the model can be otherwise trained. In such variants, the technology can additionally determine replacement cost estimation as a result of determining the potential presence and/or absence of the built structure.

In a third example, the model is trained to predict whether a basement exists, wherein a basement can be treated as an additional story. The model is trained based on remote imagery, wherein the model can identify whether there is a window well below ground level (e.g., egress window).

Figure 5:
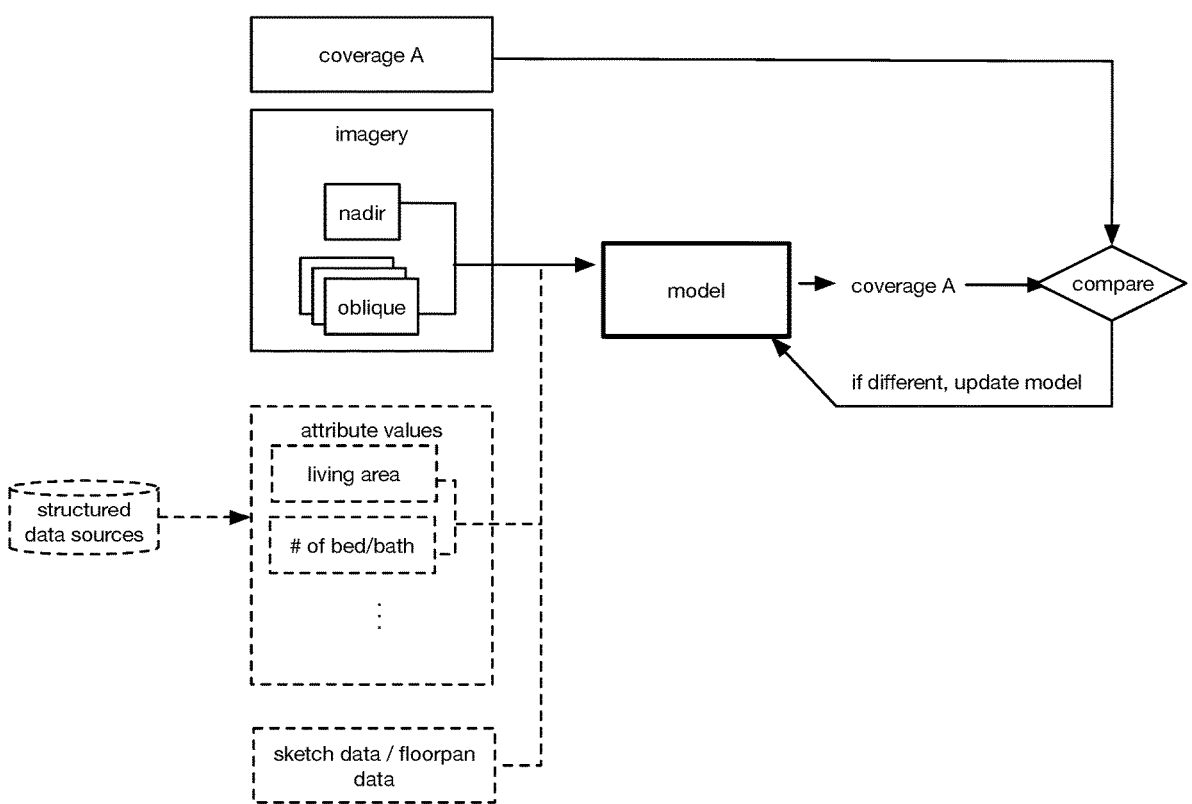
FIG. 5 is an illustrative example of training a model to predict a quality grade.

In a fourth example, the model can determine a quality grade. In a first specific example, the model is trained to predict a quality grade given interior images and/or exterior images. The training target can be a manually assigned quality grade, a calculated quality grade metric, or other target. In a second specific example, the quality grade can be determined (e.g., inferred, predicted, estimated, calculated, etc.) from an estimated replacement cost of a property (e.g., "Coverage A" on an insurance policy) and square footage (e.g., quality grade=coverage A/square footage). One or more of coverage A or square footage can be predicted using a trained model (e.g., based on imagery, sketch data, etc.; example shown in FIG. 5), or retrieved from a third-party database (e.g., from an insurer database). However, the quality grade can be otherwise determined.

Figure 4:
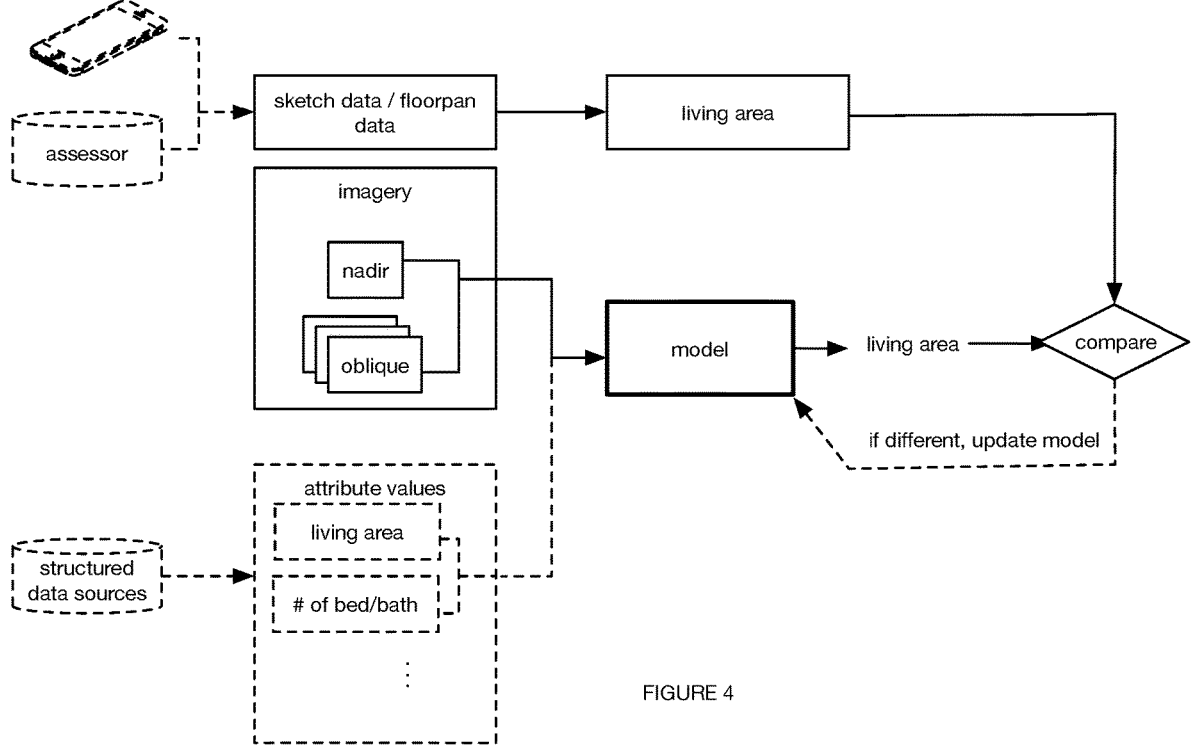
FIG. 4 is an illustrative example of training a model to predict a living area.

In a fifth example, the model is trained to predict a living area. In a first specific example, the model predicts a living area based on imagery (e.g., oblique imagery) and is trained using the living area value derived from sketch data, tax assessor data, and/or other third party data as the training target (example shown in FIG. 4). In a second specific example, the model calculates a living area from square footage and the number of stories, wherein each property component is independently determined (e.g., using other models or retrieved from other sources).

In a sixth example, attribute values can be determined using a set of segmentation and/or object detection models trained to label property components with a set of standardized labels. In a first specific example, a trained model segments the image to identify a property segment, wherein the square footage is calculated from the property segment. In a second specific example, a segmentation model identifies the primary structure and different primary structure subcomponents (e.g., a garage, a deck, a patio, fences, a pool, a primary structure, etc.). Non-living area subcomponents that are within the primary structure segment are removed, and the living area is calculated based on the remaining segment area. In variants, the property subcomponent labels can also be used to label property components in sketch data with a consistent, global taxonomy, which can be useful since sketch data labels vary between counties and databases. This can enable the sketch data from one county to be used as training data for properties from a different county.

In a seventh example, models are trained to predict: a foundation type, a number of families for the building (e.g., single family home, duplex, etc.), a type of use (e.g., residential, commercial, etc.), an exterior wall finish, and/or any other suitable attribute.

However, the model can be otherwise trained to predict values for any other suitable set of attributes.

Each value can additionally be associated with a confidence metric (e.g., confidence score, confidence interval, probability, weight, quantile, etc.) or not be associated with a confidence metric. The confidence metric can be determined based on the source's identity (e.g., based on the source's overall accuracy, historical accuracy, number of data transformations before provision, etc.), be generated during value determination (e.g., the value estimation's confidence interval, the probability that the value is the true value, etc.), based on the source's reliability for the attribute, based on the overall probability for the attribute value, and/or otherwise determined. The confidence metric can be assigned using a set of rules, be predicted or inferred (e.g., by a neural network, a classifier, etc.), be looked up, and/or otherwise determined.

In a first example, manually assessed information, such as assessor information or sketch data, can be assigned a high confidence score and/or a low confidence interval, while aggregator-derived information can have a lower confidence score and/or a higher confidence interval.

In a second example, when the value is predicted by a trained multi-class classifier, the confidence metric is the predicted probability for the value, an epistemic uncertainty value, and/or a combination thereof.

In a third example, interior attributes derived from remote data (e.g., remote imagery) can have a lower confidence metric or weight than interior attributes derived from virtual models of the property interior or manual assessments. In an illustrative example, the number of beds and baths predicted by a model using remote imagery is given less weight than the number of beds and baths derived from sketch data.

In a fourth example, record attribute values can be given higher confidence or weight when derived from records or from the attribute's values for neighboring properties, and given lower confidence or weight when derived from point-in-time data (e.g., a single image). In an illustrative example, the confidence score for a property's build year can be based on when neighboring/comparable properties were built and/or a timeseries of property states for the property.

In a fifth example, attribute models can generate a quantile distribution of attribute values, with each value associated with a respective confidence score (e.g., a probability).

However, each value can be otherwise associated with a confidence metric.

However, the set of values for an attribute of a property can be otherwise determined.

Figure 6:
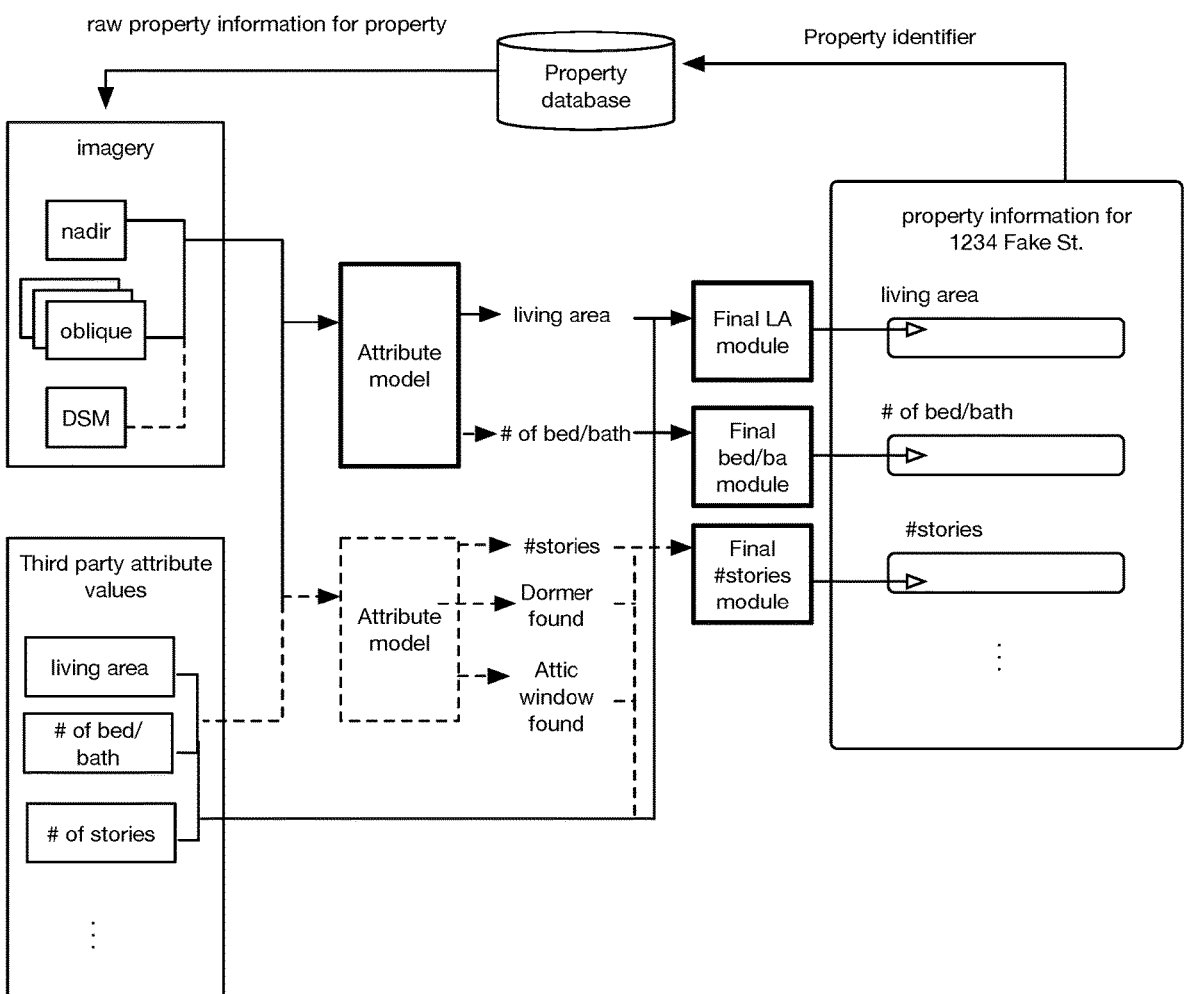
FIG. 6 is an illustrative example of using the predicted attribute values to fill out a property information form.

Determining a final value for the attribute based on the set of values S200 functions to determine a (refined) final value for the attribute (e.g., examples are shown in FIGS. 10, 11, 12A, and 12B). The refined final value can be: more accurate than third-party data, higher confidence than third-party data, associate a confidence value with the attribute value (e.g., where the attribute value previously lacked a confidence value), and/or otherwise refined. The final value can be determined using: voting, heuristics, classical programmatic techniques, ML-model based refinement, heuristics, selection based on a statistical measure of the attribute's value set, selection based on the confidence metrics for each value in the attribute's value set, and/or otherwise determined. S200 can be determined using a final value module, or be otherwise determined. The system can include a different final value module for each attribute (e.g., example shown in FIG. 6), a different final value module for related attributes, a single final value module, and/or any other number of final value modules.

Figure 12A:
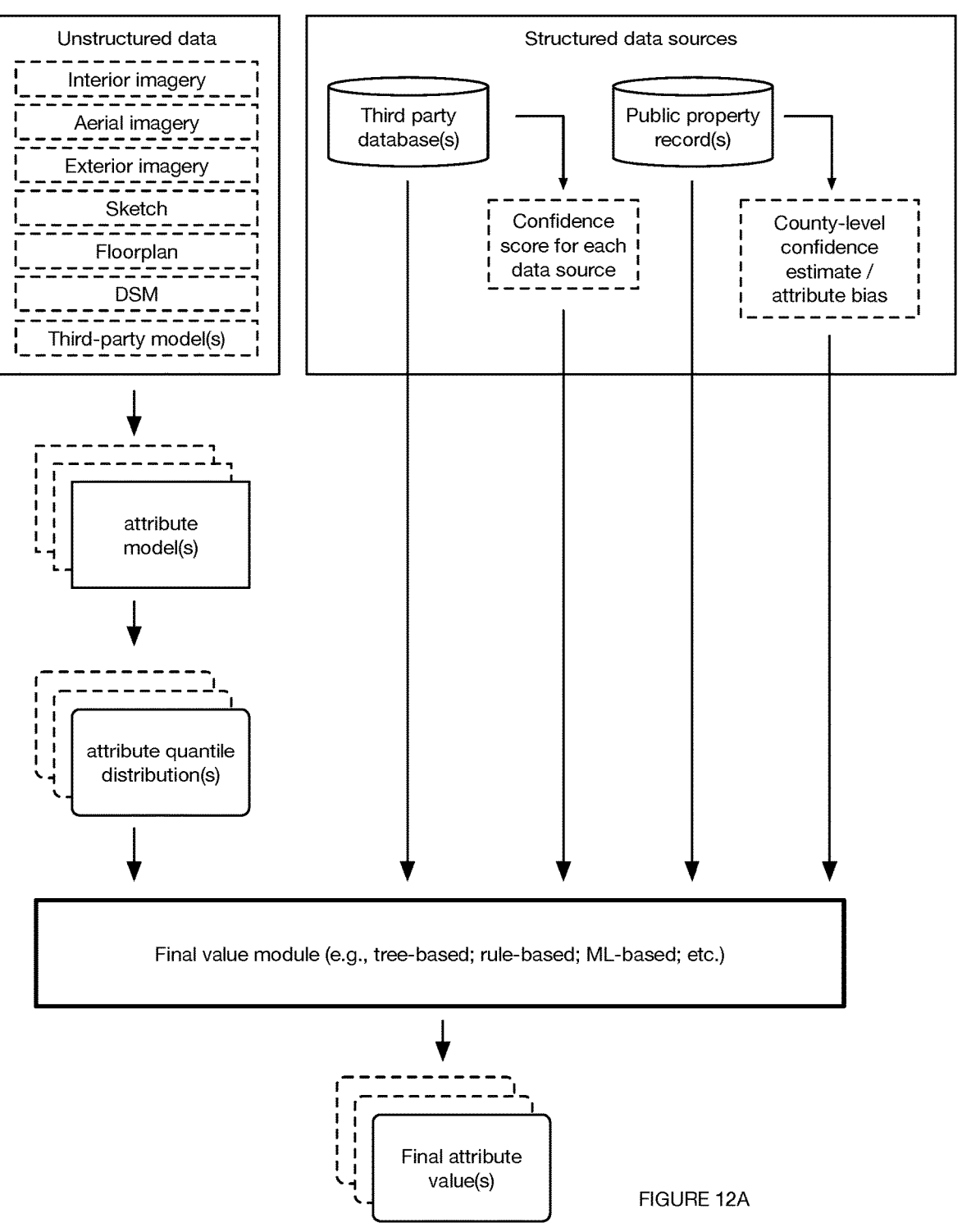
FIG. 12A is an illustrative example of determining a final attribute value.

In one example, the final value module can include: a decision tree(s) (e.g., a boosted decision tree) configured to determine a final attribute value according to a set of predetermined rules/heuristics (e.g., an example is shown in FIG. 12A).

Figure 12B:
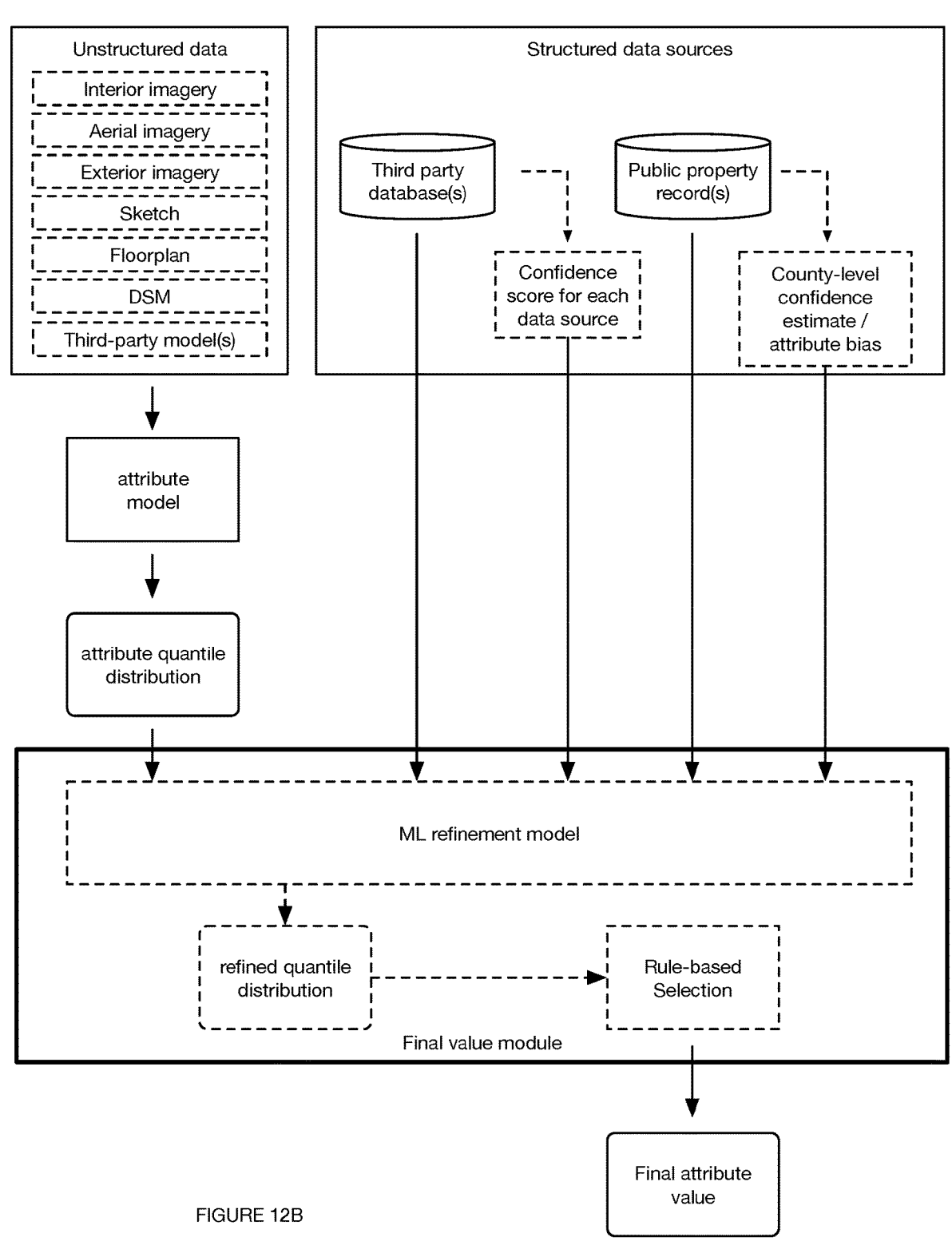
FIG. 12B is an illustrative example of determining a final attribute value.

In one example, the final value module can include an ML refinement model (e.g., CNN) and a rule-based selection program (or programmatic model; an example is shown in FIG. 12B).

Figure 8:
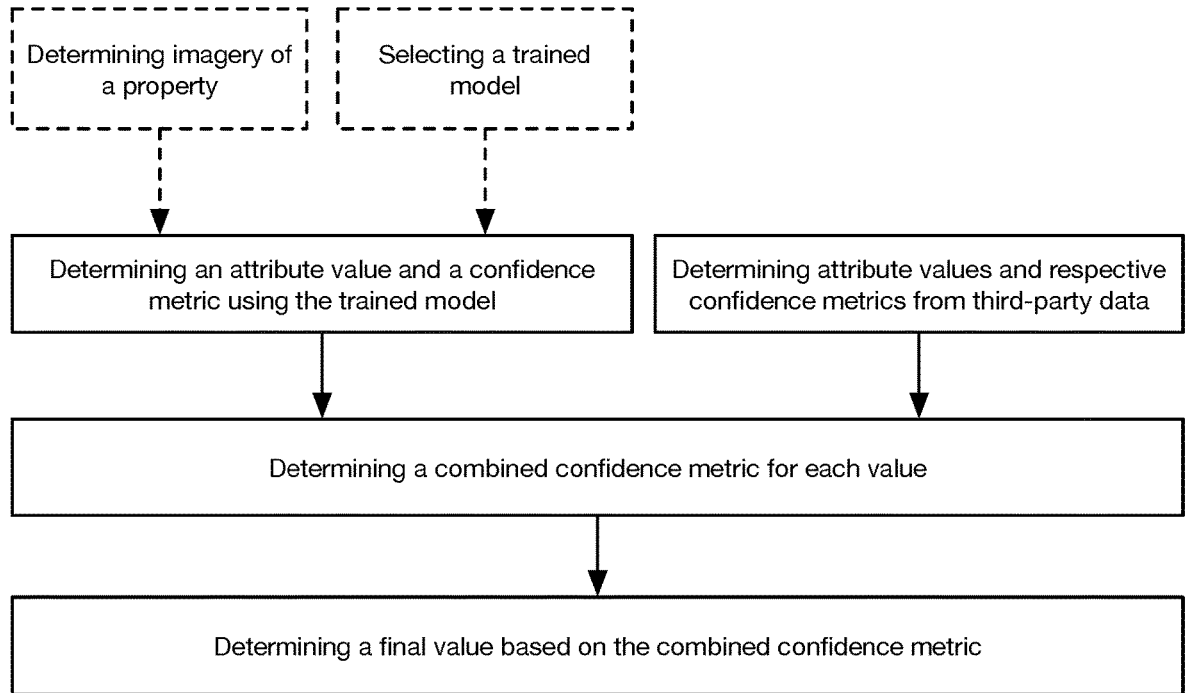
FIG. 8 is a flowchart representation of a variant of the method.

In a first variant, S200 can include selecting a final value based on a combined confidence metric. For example, this can include: determining the values appearing in the attribute's value set or the possible values for the attribute; determining the confidence metric for each determined value; combining the confidence scores for each value (e.g., multiplying, summing, averaging, etc.); and selecting the value with the highest combined confidence score (e.g., examples shown in FIG. 8 and FIG. 9).

In an illustrative example, the attribute is the number of beds in the property, and the possible value set includes: 1 bed, 2 bed, and 3 bed. The confidence scores from a first, second, and third source are as follows: source 1:1 bed 96%, 2 bed 4%, 3 bed 0%; source 2:1 bed 50%, 2 bed 50%, 3 bed 0%; and source 3:1 bed 30%, 2 bed 70%, 3 bed 0%. In this illustrative example, the combined confidence metrics (e.g., combined via averaging, such as unweighted averaging or weighted averaging based on source accuracy, etc.) can be: 1 bed 59%, 2 bed 41%, 3 bed 0%, and the property can be assigned a 1 bed attribute value.

In a second variant, the final value can be the only value (e.g., for the attribute) in the set. This can be particularly useful when all other sources do not have a value for the attribute.

In a third variant, the final value can be the median, mean, or mode of the values in the set.

In a fourth variant, the final value can be the value that a majority (e.g., simple majority, supermajority, etc.) of sources (e.g., that returned values) have returned. For example, if source 1, source 2, source 3, and source 4 returned 2 stories, 2 stories, 2 stories, and 3 stories, respectively, the final value is 2 stories for the number of stories attribute of the property.

In a fifth variant, the final value can be the value with the highest confidence score.

In a sixth variant, the final value can be determined based on the set of values, other property attribute values of the property, the geographical location of the property, the property attribute values of neighboring properties (e.g., as reported by one or more third-party sources or public data), and/or otherwise determined.

In a seventh variant, the final value can be determined by merging (or pruning) duplicate attribute values associated with distinct third-party sources based on an assumption of dependency between the first and second sources. For example, some third-party property databases may rely on public tax assessment data for some properties, which may lead to duplicated, redundant values for some (or all) attributes from such sources. Over-reliance on identical attribute values, such as square footage, may yield inaccurate confidence metrics and/or final values. Accordingly, dependency relationships between third party data sources may be estimated and/or redundant/duplicative values may be neglected during S200.

As an illustrative example, where the third-party attribute values are retrieved from at least a first source and a second source, S200 can include: removing duplicate third-party values for at least one property attribute based on an assumption of dependency between the first and second sources.

Figure 13:
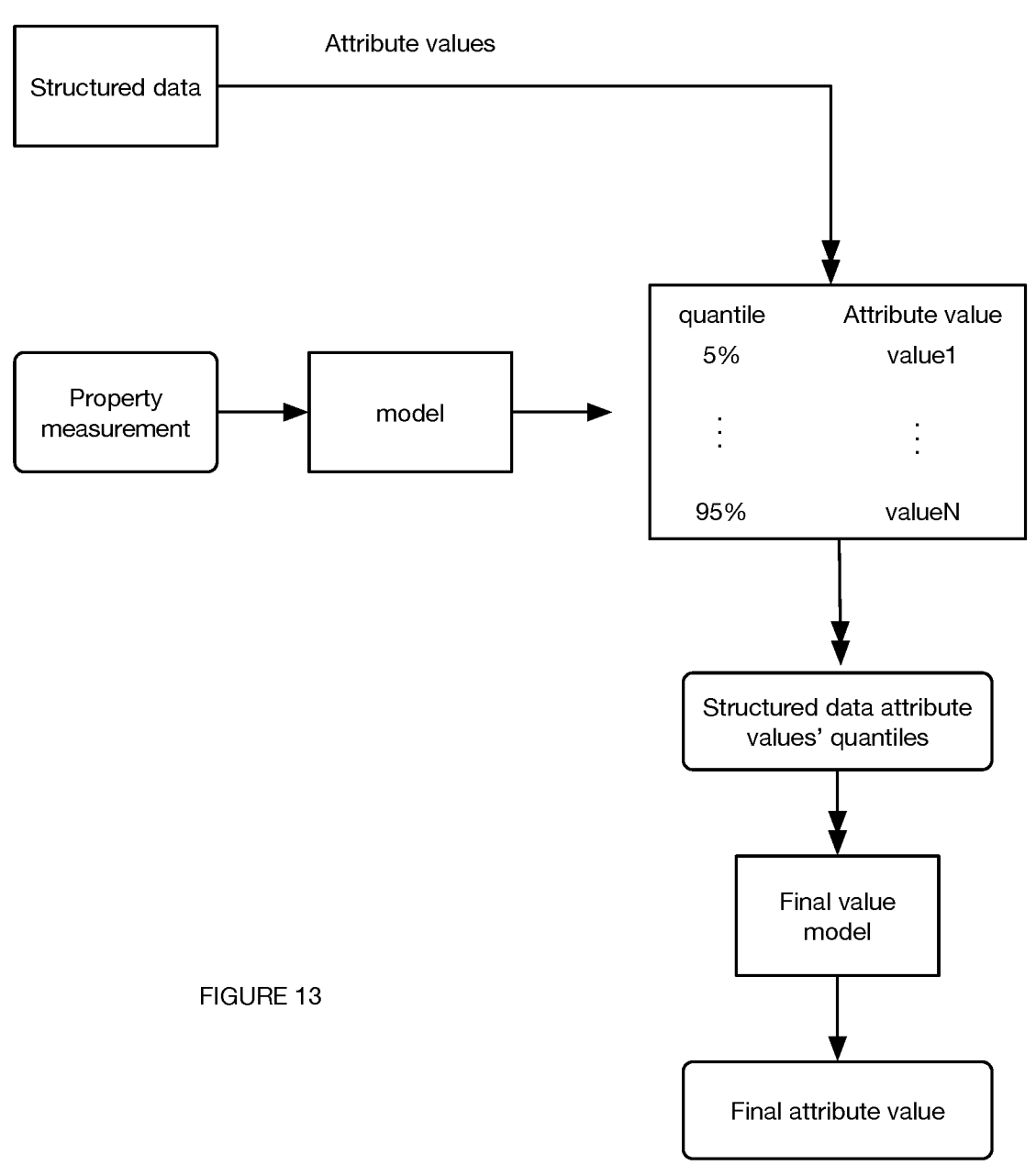
FIG. 13 is an illustrative example of determining a final attribute value.

In an eighth variant, the final value can be determined by determining the quantile that each third-party attribute value falls within (e.g., wherein the quantile-value assignments are determined by the attribute model based on a property measurement), wherein the final attribute value can be determined based on the associated quantiles (e.g., example shown in FIG. 13). For example, the third-party attribute value(s) with the quantile closest to the 50% quantile can be considered the final attribute value. In another example, the final value can be predicted or inferred (e.g., using a neural network, a machine learning model, etc.) based on the attribute value and the respective quantile or confidence metric.

Figure 11:
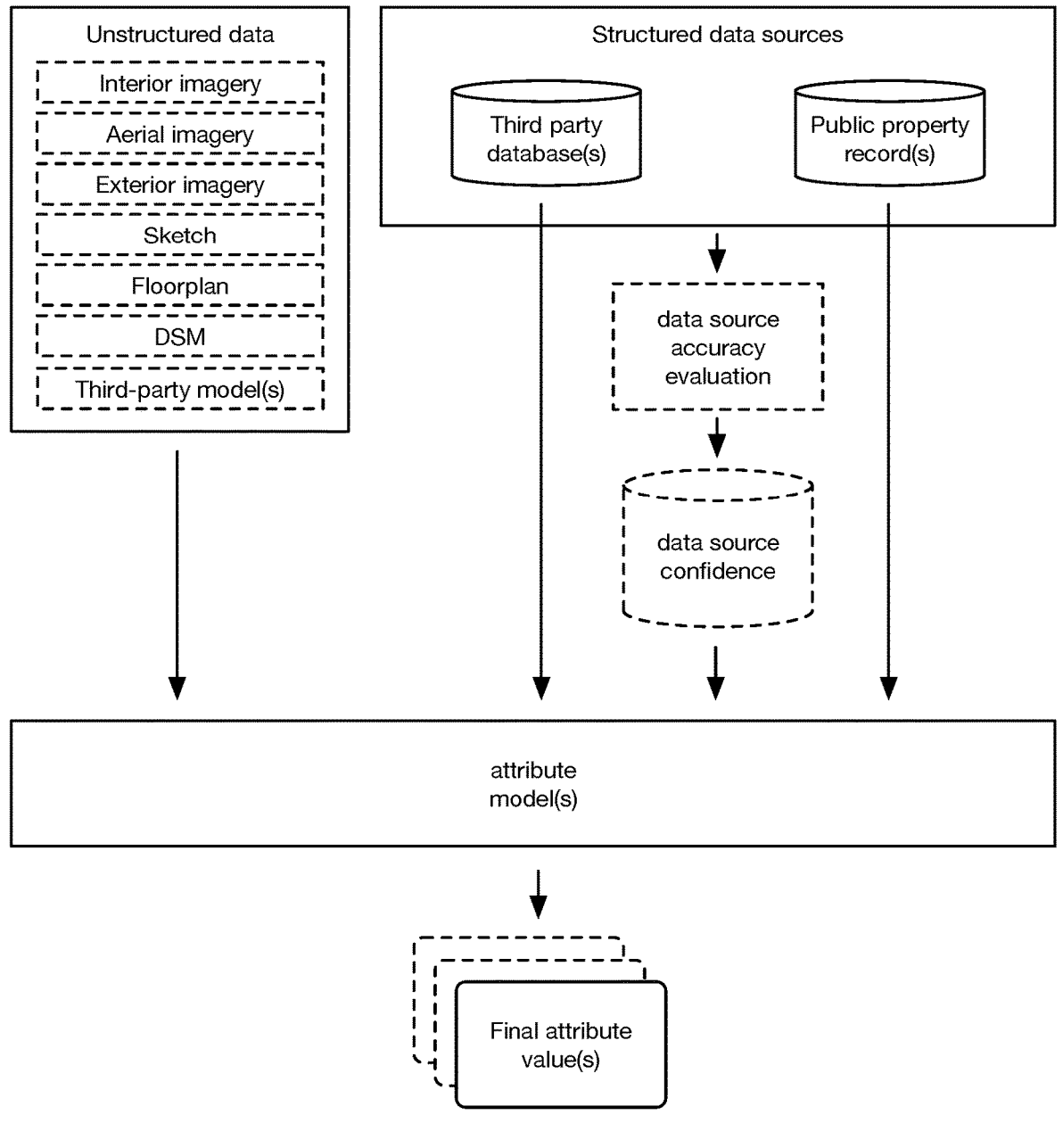
FIG. 11 is an illustrative example of determining an attribute value.

In variants, S200 can additionally accommodate geographic differences in tax-assessment data (e.g., based on county-level tax assessment guidance, standards, rules, biases, etc.; an example is shown in FIG. 11) and/or other known biases in third-party data sources. For example, county-level differences in tax assessment may be accounted for using a confidence metric (and/or a combined confidence metric) for a particular attribute, which reflects known biases, historical inaccuracies, noise, and/or other factors which may influence confidence in the data source. In examples, the data source confidence metric can be calculated (e.g., average or median error between the data source's attribute value and a true prior; a variance or covariance; etc.), learned (e.g., based on the data source's attribute value and the true prior), and/or otherwise determined. Additionally, S200 can debias and/or otherwise incorporate predetermined biases, historical inaccuracies, or other county-level tax assessment differences.

However, the final value can be otherwise determined.

Figure 7:
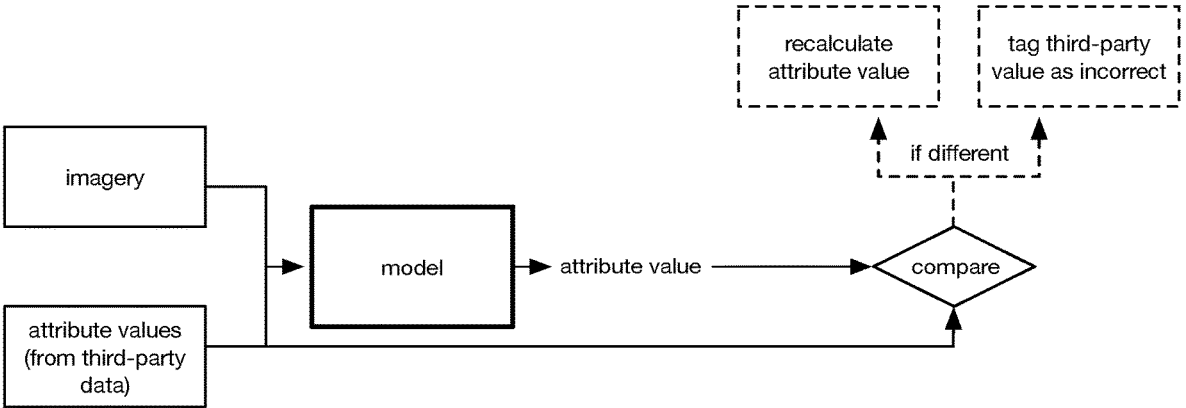
FIG. 7 is an illustrative example of validating third-party data.

S200 can optionally include validating third-party data by comparing the final value to the third-party data. For example, this can be done by comparing the final value (e.g., of an attribute) and/or the associated confidence interval to a third-party value indicated in the third-party data. If the final value is substantially similar to the third-party value, the final value remains the same. However, if the final value is not substantially similar to the third-party value, the third-party value can be tagged as incorrect (e.g., marked for further validation) or the final value can be recalculated (e.g., example shown in FIG. 7). However, disagreements between the third-party attribute values, the final values, and the model-derived values can be otherwise managed. As an example, in cases where there is disagreement between the final value and the third-party data, where a confidence associated with the final value falls below a predetermined threshold, and/or in other situations, the final value of at least one property attribute of the set can be estimated and/or updated based on property information associated with a set of neighboring properties, such as using a geospatial clustering algorithm (e.g., estimating based on k nearest neighbors, etc.). For example, the build year of a property may be estimated based on the build year of neighboring properties (e.g., particularly if the build years are closely clustered, such as in a single development complex).

S200 can optionally include providing the final value to an endpoint (e.g., through an interface or API). The endpoint can be: an endpoint on a network, a customer endpoint, a user endpoint, an automated valuation model system, a real estate listing service (e.g., Redfin™), an insurance system, and/or any other suitable endpoint. The interface can be: a mobile application, a web application, a desktop application, an API, a database, and/or any other suitable interface executing on a user device, gateway, and/or any other computing system. For example, an insurance system can auto-fill attribute values into a form for the property.

However, the final value for the attribute can be otherwise determined.

The method can optionally include determining interpretability of the trained models, wherein the identified features (and/or values thereof) can be provided to a user, used to identify errors in the data, used to identify ways of improving the model, and/or otherwise used. Interpretability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), and/or any other suitable method and/or approach.

5. Use Cases

The final value can be used in various applications.

In a first example, the final value can be used by insurance companies during underwriting (e.g., use the final value as pre-fill to speed up onboarding process of acquiring a new customer to better estimate replacement costs; determine when to reach out to adjust the policy, such as when the living area and/or quality grade value changes at a rate greater than a predetermined threshold). The prefilled form can be provided to the customer or other remote endpoint as a document (e.g., pdf), as an API response, and/or in any other suitable format.

In a second example, the final value can be used in real estate investing. In a specific example, single family residential/institutional investors can identify properties in their portfolio that have suffered damage (e.g., the quality grade is decreasing over a time period).

In a third example, the final value can be used in real estate valuation/appraisal (e.g., use final value as an input to an automated valuation model; use final value to detect error in property evaluation models; use final value to determine automated valuation model accuracy, use final value as a supplement to a property-level valuation report; etc.). For example, one or more of the final values and/or confidence values can be used by an automated valuation model to predict the valuation of a property. The automated valuation model can be: retrieved from a database, determined dynamically, and/or otherwise determined. The automated valuation model preferably predicts the market valuation of a property based on the final value and/or confidence value, but can alternatively predict other attribute values of the property, and/or any other suitable value. The final value provided to the automated valuation model is preferably associated with a property of interest, but can alternatively not be associated with a property of interest. The final value provided to the automated valuation model can be the only input, provided along with one or more other values, and/or otherwise provided to the automated valuation model.

In a fourth example, the final value can be used by real estate property listing services (e.g., use final value to fill out real estate listing data).

Figure 14:
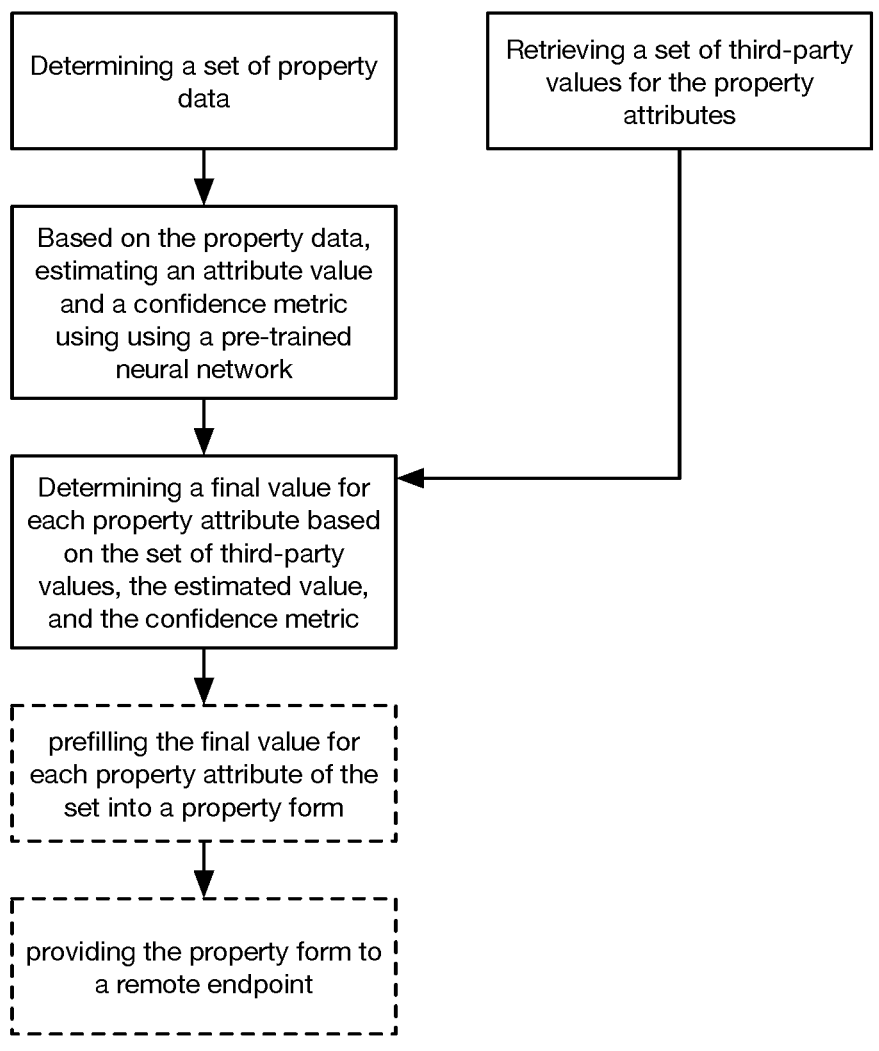
FIG. 14 is an example flowchart representation of a variant of the method.

In a fifth example, the final value(s) can be used to prefill a property form (e.g., where attributes correspond to entry fields for the property form; an example is shown in FIG. 14), such as may be used for underwriting, replacement cost estimation, property risk assessment, and/or can be otherwise used. Additionally, the final value(s) within the property forms can be validated and/or updated based on a user feedback provision(s), which may further be used as training data to retrain/update the ML model(s).

However, the final value can be otherwise used.

Alternative embodiments implement the above methods and/or processing modules in non-transitory computer-readable media, storing computer-readable instructions, that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method comprising:
    determining raw property data for a property, the raw property data comprising imagery of the property;
    based on the raw property data, estimating, for each of a set of property attributes, an attribute value and a confidence metric using a pretrained neural network;
    retrieving a set of third-party values for each property attribute of the set;
    determining a respective confidence metric for each third-party value;
    for each property attribute of the set of property attributes, determining a combined confidence metric based on a combination of the respective confidence metrics of the attribute value and third-party value;
    automatically determining a final value for each property attribute based on the set of third-party values, the estimated attribute value, and the combined confidence metric;
    automatically prefilling the final value for each property attribute of the set into a property form; and
    providing the property form, prefilled with the final value for each property attribute of the set, to a remote endpoint.

2. The method of claim 1, further comprising: estimating the final value of at least one property attribute of the set based further on a set of neighboring properties, using a geospatial clustering algorithm.

3. The method of claim 1, wherein the set of property attributes comprises at least one of a roof area or a square footage of living space.

4. The method of claim 1, wherein the property form comprises a property valuation form.

5. The method of claim 1, wherein the third-party values are retrieved from at least a first source and a second source, wherein the method further comprises:

identifying an assumption of dependency between the first and second sources; and removing duplicate third-party values for at least one property attribute based on an assumption of dependency between the first and second sources.

6. The method of claim 1, wherein the third-party values are retrieved from at least a first source comprising a tax assessment associated with a geographic region, wherein the respective confidence metrics are determined based on a set of predetermined biases for the geographic region.

7. The method of claim 1, wherein each combined confidence metric is a probability.

8. The method of claim 1, wherein the attribute value and the confidence metric are estimated as part of a distribution.

9. The method of claim 1, wherein the set of property attributes comprises a roof area and a square footage of living space.

10. A method for property replacement cost estimation, comprising:

receiving a set of unstructured property data for a property;

with a set of pretrained machine learning (ML) models, determining an ML-model estimate based on the unstructured property data, the ML-model estimate comprising an attribute value and a confidence metric for each of a plurality of property attributes;

retrieving a set of tax assessment values, each corresponding to a respective property attribute of the plurality, wherein the tax assessment values are retrieved from a structured, third-party dataset associated with a geographic region and is structured based on rules of the geographic region;

based on a predetermined bias of the geographic region, determining a respective confidence metric for the tax assessment value;

determining a combined confidence metric based on the confidence metric associated with the estimated value and the respective confidence metric for the tax assessment value;

with a tree-based model, automatically determining a replacement cost for the property based on the set of tax assessment values, the ML model estimate, and the combined confidence metric; and providing the replacement cost to a remote endpoint.

11. The method of claim 10, wherein each of the plurality of property attributes is determined with a respective pretrained ML model of the set which is pretrained for the property attribute.

12. The method of claim 11, wherein the respective pretrained ML model for each property attribute is pretrained using supervised learning with a training dataset which is independent of the unstructured property data and tax assessment values.

13. The method of claim 10, further comprising:

using the tree-based model, determining a final value for each property attribute of the plurality based on the set of tax assessment values, the ML model estimate, the confidence metric, according to a set of predetermined rules; and automatically prefilling a property form with the final value for each property attribute; and updating at least one final value within the property form based on a user feedback provision.

14. The method of claim 13, comprising: automatically determining the replacement cost based on the property form.

15. The method of claim 10, wherein the unstructured property data comprises: imagery and sketch data.

16. The method of claim 15, wherein the imagery comprises geospatial imagery and interior imagery.

17. The method of claim 10, wherein the attribute value and the confidence metric are estimated as a quantile distribution.

* * * * *